US009128804B2

(12) United States Patent
Göres

(10) Patent No.: US 9,128,804 B2
(45) Date of Patent: Sep. 8, 2015

(54) SYSTEMS AND/OR METHODS FOR IDENTIFYING AND RESOLVING COMPLEX MODEL MERGE CONFLICTS BASED ON ATOMIC MERGE CONFLICTS

(75) Inventor: Jürgen Göres, Kaiserslautern (DE)

(73) Assignee: SOFTWARE AG, Darmstadt (DE)

(*) Notice: Subject to any disclaimer, the term of this patent is extended or adjusted under 35 U.S.C. 154(b) by 431 days.

(21) Appl. No.: 13/024,646

(22) Filed: Feb. 10, 2011

(65) Prior Publication Data

US 2012/0210294 A1 Aug. 16, 2012

(51) Int. Cl.
*G06F 9/44* (2006.01)

(52) U.S. Cl.
CPC ........................................ *G06F 8/71* (2013.01)

(58) Field of Classification Search
CPC ................ G06F 8/71; G06F 8/34; G06F 8/10
USPC .......................................... 717/105, 121, 122
See application file for complete search history.

(56) References Cited

U.S. PATENT DOCUMENTS

| 6,678,882 | B1* | 1/2004 | Hurley et al. | 717/121 |
|---|---|---|---|---|
| 7,028,057 | B1* | 4/2006 | Vasudevan et al. | 707/695 |
| 8,286,132 | B2* | 10/2012 | Yuan et al. | 717/120 |
| 2004/0177343 | A1* | 9/2004 | McVoy et al. | 717/122 |
| 2008/0147693 | A1* | 6/2008 | Clemm et al. | 707/101 |
| 2009/0265684 | A1* | 10/2009 | Fuchs et al. | 717/105 |

OTHER PUBLICATIONS

L. Bendix et al., "The Case for Batch Merge of Models—Issues and Challenges," Models and Evolution Workshop, Oslo, Norway, Oct. 3, 2010.
P. Brosch et al., "Representation and Visualization of Merge Conflicts with UML Profiles," Models and Evolution Workshop 2010, Vienna University of Technology.
M. Koegel et al., "Collaborative Model Merging," Technische Universität München, Institute für Informatik, Aug. 4, 2010.
R. Pottinger et al., "Merging Models Based on Given Correspondences," Proceedings of the 29th VLDB Conference, Berlin, Germany, 2003.

(Continued)

*Primary Examiner* — Li B Zhen
*Assistant Examiner* — Viva Miller
(74) *Attorney, Agent, or Firm* — Nixon & Vanderhye, P.C.

(57) ABSTRACT

Certain example embodiments described herein relate to interactive model merging systems and/or methods and, more particularly, to using basic information obtained during merging to help a user resolve high-level merge conflicts. In certain example embodiments, instead of leaving it to the user to resolve the merge conflicts on the level of the atomic elements (e.g., objects and connections with a non-empty merge state), the recognition of high-level merge conflicts may help capture the semantics of the differences between the models being merged on a larger scale (e.g., covering a possibly very large number of model elements in one conflict) and/or also may generally help allow the user to resolve them easily and quickly within a reduced number of operation. The high-level merge conflicts may be resolvable at their high levels or decomposed and resolved at a lower level depending, in part, on the type of conflict involved.

33 Claims, 14 Drawing Sheets

(56) References Cited

OTHER PUBLICATIONS

C. Bartelt, "Consistence Preserving Model Merge in Collaborative Development Processes," Software Systems Engineering Group, University of Clausthal, CVSM '08, May 17, 2008, Leipzip, Germany.

SpringerLink—Abstract, "Model Driven Engineering Languages and Systems", Lecture Notes in Computer Science, 2009, vol. 5795/2009, 167-180, DOI: 10.1007/978-3-642-04425-0_13, screenshot taken from http://www.springerlink.com/content/qz115nl594227356/.

* cited by examiner

SYSTEMS AND/OR METHODS FOR IDENTIFYING AND RESOLVING COMPLEX MODEL MERGE CONFLICTS BASED ON ATOMIC MERGE CONFLICTS

FIELD OF THE INVENTION

Certain example embodiments described herein relate to interactive model merging systems and/or methods. More particularly, certain example embodiments use the basic information obtained during merging to help the user resolve high-level merge conflicts. In certain example embodiments, instead of leaving it to the user to resolve the merge conflicts on the level of the atomic elements (e.g., objects and connections with a non-empty merge state), the recognition of high-level merge conflicts may help capture the semantics of the differences between the models being merged on a larger scale (e.g., covering a possibly very large number of model elements in one conflict) and/or also may generally help allow the user to resolve them easily and quickly within a reduced number of operation.

BACKGROUND AND SUMMARY OF EXAMPLE EMBODIMENTS OF THE INVENTION

A "model" may be thought of as a description of a complex application artifact (e.g., business processes, data structures, structure and behavior of software systems, etc.) that is not given in an informal fashion, but rather uses the modeling primitives and conventions of a well-defined "abstract language," namely, a so-called metamodel. Some common metamodels include the UML family of modeling languages (e.g., UML class diagrams, UML collaboration diagrams, etc.), the BPMN metamodel, the ARIS family of modeling languages (EPC, VAC, FAD, etc.), the entity-relationship (meta)model (ERM), the relational (meta)model, etc. A metamodel, being an abstract language, itself is a collection of modeling elements that may be used or "instantiated" to describe the actual models. For example, in a UML class diagram, the modeling elements are classes, associations, properties, etc., while the model elements in the relational model are relations and their attributes.

A metamodel in principle is independent of concrete notation (and thus was referred to as an "abstract language" above) as, as such, may be thought of as defining only of the language concepts and the rules for their use to form a valid model for this metamodel. Of course, to do actual modeling with a metamodel, a concrete notation is used. For example, the boxes with three "compartments" represent UML classes, labeled rectangles and diamonds are used to represent entities and relationships in the ERM, etc.

A trait common to many metamodels is that its corresponding models may be represented as a graph including nodes and edges that together may be referred to as the graph's "elements." Software systems handling different "kinds" of models (for example, so-called model management systems) often use some kind of graph model as internal representation for all kinds of models.

Model merging involves creating a single merged result model C from two models A and B (where A, B, and C are expressed in the same metamodel) that describes the same or overlapping sets of application artifacts (e.g., the same software system, the same business process, etc.), but describes these artifacts more or less differently. For example, A and B could be two versions of the same original model that were modified independently, or describe not exactly the same aspect of the application domain with an overlap in some parts.

A merge oftentimes ideally delivers a merged model C that does not contain any redundancies, e.g., such that all model elements that appear in both A and B appear at most once in C. Depending on the exact purpose of C, it often is desirable to preserve all elements that are either in A or B (e.g., to not lose any information from the input models). However, this typically is not a general requirement. Further, it would be desirable to make C consistent and well-formed such that it fulfills all constraints of its respective metamodel.

Because models are a kind of graphs, model merging is a very different challenge than the more ubiquitous (usually line-wise) merging of text files as it is done, e.g., in version control systems. Naturally, text-based merging of models is possible if there is a textual (e.g., XML-based) notation for respective metamodels. However, text-based merge tools are not natural tools for handling the merging of models. First, most textual representations are ill-suited for direct use by humans, and instead are intended to be used as storage formats and/or to be used in model interchange. In particular, the structure of (linear) textual representations usually differs considerably from the non-linear, graph-like structure of the model itself, thereby making it cumbersome to work directly with these representations. Second, even small changes of a model may lead to significant changes of its textual representation, making it hard to differentiate between the actual changes on the model level and purely "syntactical" changes necessitated by the textual representation. Text-based tools therefore are viewed as being inappropriate for model merging.

The merging of two models A and B involves a method for identifying pairs of elements $a_i$ and $b_j$ from A and B, respectively, which are considered identical and thus are those elements that, after a successful merge operation, appear only once in the resulting merged model C. As used herein, "identical" element pairs are provided as a mapping relation $map_{AB}: A \times B$.

It will be appreciated that $map_{AB}$, being a relation, does not need to be an injective and does not need to be a surjective or even a function in that, in general, model elements from A need not have counterparts in B and vice versa, and an element $a_i$ from A could possibly have several "identical" elements $b_{i1}, \ldots b_{in}$ in B and vice versa. Methods for producing such a $map_{AB}$ from two models A and B sometimes are called schema or model matching. In other scenarios, such a $map_{AB}$ may also result from the process that created models A and B.

Based on the content of $map_{AB}$, it is possible to distinguish different categories of (pairs of, groups of, or individual) objects from A and B:

1. If two objects $a_i \in A$ and $b_j \in B$ are identified as identical by $map_{AB}$ (i.e., $(a_i, b_j) \in map_{AB}$), and if no other entries involving $a_i$ or $b_j$ exist in $map_{AB}$ a ($\nexists a_x$ s.t. $(a_x, b_j) \in map_{AB} \wedge \nexists b_y$ s.t. $(a_i, b_y) \in map_{AB}$) and if $a_i$ and $b_j$ agree on all properties that are relevant for the merge method (e.g., certain attributes etc.), $a_i$ and $b_j$ are called equal. If $a_i$ and $b_j$ differ in some of their merge-relevant properties, these objects are referred to as changed.
2. Objects $a_i \in A$ ($b_j \in B$, resp.) for which there exists no object $b_j \in B$ ($a_i \in A$, resp.) such that $(a_i, b_j) \in map_{AB}$ ($\nexists b_j \in B$ s.t. $(a_i, b_j) \in map_{AB}$) ($\nexists a_i$ s.t. $(a_i, b_j) \in map_{AB}$, resp.) are called added in A (and added in B, respectively).
3. If two objects $a_i \in A$ and $b_j \in B$ are identified as identical by $map_{AB}$ (i.e., $(a_i, b_j) \in map_{AB}$), and if other entries involving $a_i$ or $b_j$ exist in $map_{AB}$ (($a_x$ s.t. $(a_x, b_j) \in map_{AB} \vee (b_y$ s.t. $(a_i, b_y) \in map_{AB}$), such objects are referred to as conflicting.

With this information, a merge method now attempts to create a consistent result model C. While the handling of objects that are equal is trivial, for all other kinds of objects, decisions have to be made if and how to accept them into the result model C. These decisions depend on the intended purpose of C, the details of the conflicts, the context in which A and B were created, etc. These considerations illustrate that model merging is inevitably a manual task of which only certain trivial tasks can be safely automated. Thus, in general, a human decides which elements and which properties to take from A and which from B for inclusion in the result C. As will become clear from the detailed description below, certain example embodiments described herein relate to improved techniques that support the user with this task, e.g., in the context of the ARIS model transformation component.

The ARIS model transformation component allows one to declaratively describe how models of one type can be transformed into a semantically related model of a different (or sometimes also the same) model type. An example for such a transformation is shown in FIG. 1. In FIG. 1, an example business process modeled using the event process chain (EPC) metamodel is transformed into an equivalent process in the Business Process Model and Notation (BPMN) metamodel. This transformation is referred to as the EPC-2-BPMN transformation. While the EPC metamodel is meant to be used by business-oriented users to capture business processes as they are (or should be) handled in an organization, BPMN is a metamodel and notation that also covers more technical aspects. Using the EPC-2-BPMN transformation, a BPMN may be created from an EPC to be used as starting point to enrich the business view of a process with technical details to ultimately make the process executable by a suitable runtime environment such as, for example, a workflow management system (WfMS).

The description of the transformation is given by so-called transformation patterns, which specify how individual or groups of elements of the source model type are to be translated into corresponding elements of the target model type. The ARIS model transformation and, in particular, the graphical way to describe transformation patterns, is disclosed in commonly assigned U.S. Patent Application No. 61/071,255, entitled "Systems and Methods for Graphically Developing Rules for Transforming Models Between Description Notations."

In the context of the model transformation, the situation often occurs that after the creation of the initial transformed model T via a transformation run, the source model S is changed by a business user, yielding a modified source model S'. This scenario is illustrated in FIG. 2. To get these changes to the technical BPMN layer, it is possible to simply transform S' again, yielding a new transformed model T'. However, in the meantime, a process engineer might have modified the original BPMN model T and augmented it with technical information, thereby yielding a modified BPMN model T". In this case, it might not be possible to simply replace T" with T' to get the business-level changes to the technical level, as doing so would risk losing some or all of the changes by the technical user that yielded T" in the first place. Unless either T' or T" can be discarded as a whole and only the changes from T" or T' are to be taken into the result, a way is needed to combine the independent changes in T' and T" into a single, consistent merged model $T_M$ by merging these two models T' and T". In this merge process, T' (the model resulting from transforming the modified source model S') is referred to as the new transformed model, and T" is referred to as the merge target model.

FIG. 2 demonstrates conflicts related to the independent modifications to the source model and the transformed model. More particularly, in the FIG. 2 example, the business user added a function F3 to the process as an (exclusive) alternative to F2 to create S'. In the original transformed model T, the process engineer added an additional task F2b to create T". F2b could represent a task that is necessary from a technical standpoint, but need not be reflected on the business level, for instance. When S' is now transformed to obtain T', it can be seen that T' and T" differ and that a merge needs to be performed to obtain a result that reflects the changes in both models as good as possible.

As mentioned above in connection with the general model merge problem, to be able to successfully merge the two models T' and T", it would be desirable to provide a way to identify elements that are to be considered "identical" for the purpose of merging, e.g., a way to obtain a $\text{map}_{T'T''}$. Instead of using fuzzy methods like guessing at identical objects based on their properties (e.g., name, type, etc.), or even leaving the identification of pairs of identical objects completely to the user, the transformation itself may place "trace" information on all elements that it creates. This trace information may contain for each element $t_i$ in the transformed model, among other things, information about the source element(s) in model S that were "responsible" for the creation of $t_i$, which transformation patterns were involved in the creation of $t_i$, etc. Two objects $t' \in T'$, $t'' \in T''$ may be considered to be identical (and thus will be found in a tuple of $\text{map}_{T'T''}$) if they agree to a certain degree in their trace information and some additional properties. Although the exact implementation details may vary, it will be appreciated that the trace information allows one to obtain the $\text{map}_{T'T''}$.

In the existing implementation of the model merge in the scope of the ARIS model transformation, the transforming of S' into T' and merging T' with the merge target model T" with T' is an integral process. The user picks the source model and the merge target model, and is then presented a single model that illustrates the conflicts between T' and T". This model is referred to as the conflict model $T_C$, and FIG. 3 illustrates a conflict model used as a user interface paradigm to perform interactive conflict resolution. In the conflict model, the user may resolve the remaining conflicts to create the final merge model $T_M$. Conflicts may be indicated with graphical icons next to the conflicting elements. These icons sometimes are referred to as the element's "merge state."

With the $\text{map}_{T'T''}$ obtained via the transformation's trace information as discussed above, the conflict model is created as follows.

Pairs of elements $a \in T'$ and $b \in T''$ that are identical or changed are shown only once in the result, like the functions F1 and F2, the start and end events, the lanes and the pool in the FIG. 3 example. These elements have no conflicts or "merge state" associated with them. It will be appreciated that in the current implementation, any attribute changes that occurred in S' are simply written into the existing objects such that the source model silently overwrites any attribute changes in the target. Thus, for the purpose of the merge in the ARIS model transformation, equal and changed objects (as described above) are handled identically.

Elements that are found in T' but have no counterpart in T" (according to $\text{map}_{T'T''}$) are added to the conflict model and flagged with the merge state "added by transformation" (or "added in source"), indicated by a green plus icon next to these elements. In the FIG. 3 example, the BPMN gateway created from the new XOR rule, the task F3 created from the new function F3, and the new "End 2" end event are marked as such, as are all connections between them. Further, the connection between task F2 and the end event "End" is marked with "added by transformation." Although the corresponding connection has not been changed from S to S', the reason for this merge state is that the corresponding connection in T" had been deleted when F2b was inserted by the process engineer. In a perfect world, the actual merge state of this connection would have to be "deleted in target." The merge, however, cannot distinguish between these two situations. That is, to be able to correctly flag this connection as "deleted in target," it would be necessary to preserve the complete change history of T'.

For elements that are found in T" and have no counterpart in T', two situations can be differentiated. If an element t was created by the (original) transformation (which can be determined based on the presence of trace info on t), this indicates that the source model S' has changed in a way that an object corresponding to t is no longer created by the current transformation. Consequently, it is added to the conflict model and it is flagged with the merge state "deleted by transformation," as indicated by a red minus icon. In the FIG. 3 example, the connection between F1 and F2 that was in the original T and was preserved by the process engineer when creating T" is marked as such, because the connection no longer exists in T', since the corresponding connection in the EPC has been deleted by the business user when going from S to S'.

If an element t was manually added to T", which is recognized by the absence of trace information, it also is added to the conflict model and flagged with the merge state "added in target," indicated by a blue plus icon. In the FIG. 3 example, the function F2b and incident connections are marked as such.

Each element that has one of the three merge states is referred to as an atomic conflict.

All atomic conflicts in the conflict model are listed in a table shown below the model, as illustrated in FIG. 4, which is simply an example conflict table. "Inserted" corresponds to "added by transformation," "deleted" corresponds to "deleted by transformation," and "changed" corresponds to "added in target model. The FIG. 4 example table shows additional atomic conflicts pertaining to model elements that have no visual counterpart in the conflict model including, for example, the "belongs to" connections. A connection of type "belongs to" is an example for a container connection. Container connections are used in ARIS models to connect an object to its container object (e.g., from a task to its containing lane, from a lane to its containing pool, etc.), thereby expressing that an object is part of a container instead of relying solely on object dimensions and positioning to express the containment relationship.

Via the FIG. 4 example table, the user may individually accept and reject individual atomic conflicts. When accepting an "added by transformation" or "added in target model" conflict, the corresponding model element is retained and the merge state is removed, thereby indicating that the conflict has been resolved. When rejecting such a conflict, the model element is deleted. When accepting a "deleted by transformation" conflict, the element is deleted. When rejecting it, the element is retained and the merge state is removed.

Aside of the existing merge functionality in the ARIS model transformation component, ARIS offers an XML-based import and export mechanism to transfer ARIS models between different ARIS databases and thus includes the ARIS model merge component. For example, a model M is created in DB X, exported to a file, and imported into DB Y. Assume that model M is now changed in X, yielding a modified model M', and at the same time, the originally imported model M is also changed independently in DB Y, yielding model M". M' is now exported again into an XML file, and imported into DB Y. Because M' and M" are different versions of the same model (a fact that is recognized via unique identifiers on the model and all its model elements), a model merge must be performed. When importing M', the user may select whether or not model M' (setting "source overwrites target") or model M" (setting "target preserved") will "win" in case of conflicts. These settings may be set differently for objects, connections, and models. However, this merge does not offer selective control over how individual conflicts are resolved and is not interactive.

Oracle's Business Process Analysis Suite offers a model merge functionality (named "process differences") in the context of their handling of BPEL models. The merge functionality does not use a single conflict model as the merge in the ARIS model transformation, but instead shows the two models that are to be merged side-by-side and highlights the differences in each of the models. Based on the current selections on the differences in the two models, in a third section of the screen, the current state of the merged model is shown. The actual differences recognized by the Oracle BPA merge component closely correspond to the "atomic differences" identified by the ARIS transformation merge functionality discussed above.

The inventor of the instant application has found the individual selecting and manual accepting or rejecting of the model elements that could not be merged (i.e., that have no corresponding element in the other model and therefore have a merge state) to be very tedious and error prone, especially if the models are large and have many differences. For example, objects that have different merge states and are actually the result of one large change in A or B can be "far apart" from each other in the partially merged model and are therefore difficult to find and resolve consistently.

IBM Rational Software Architect (IRSA) is an integrated development environment (IDE) building on the Eclipse platform. On top of the basic functionality of the free Eclipse IDE, it adds features for modeling software design artifacts using diagrams of the UML family of metamodels. Inherited from Eclipse, it offers the basic text-based comparison of files. However, as discussed above, the comparison of complex design artifacts like models in a text-based representation is generally inadequate for the task at hand. Therefore, IRSA offers a model comparison and merging functionality.

In the ARIS world, the term "model" is basically used synonymously with "diagram." However, a "model" in IRSA is an entire set of diagrams and all model elements, whether or not these elements are actually currently shown in a model. Therefore, an IRSA model roughly compares to an ARIS database.

In the IRSA comparison/merge functionality, the two models being compared and/or merged are shown in a split view, similar to the one offered by the Oracle BPA suite. The models themselves may be displayed in their graphical representation or in a tree representation that is based on the internal structure of the models. To understand this tree, one has to know that the UML models in IRSA are implemented using the Eclipse Modeling Framework. Here, containment relationships play a pivotal role. For example, in UML models, and some kinds of models implemented with EMF, the containment structure plays a pivotal role. For example, classes are contained in a UML class diagram. That is, the model element representing a class is connected from the model element representing the "root" of the model with a containment connection. Similarly, a class's properties, fields, and operations are contained in the respective classes, parameters of operations are again contained in the element representing the operation, etc.

The actual differences recognized by IRSA again roughly correspond to the "atomic conflicts" of the ARIS model transformation merge functionality described above, but also may cover differences like modifications of an element's attributes or other properties, which are currently not relevant for the ARIS merge functionality. IRSA does not simply provide a "flat" list of all model elements that were added, deleted, or changed between the two versions of a model being compared, but instead "groups" the individual atomic changes based on this containment structure in a "structural differences" tab. Here, the individual changes are shown in a tree structure within a node representing the respective "parent" or "container." Assume, for example, a container model called "hw1," represented in UML 2, and including the "hello world" class that, in turn, includes first and second attributes and first and second operations. In IRSA, deleting the "hello world" class from the container model "hw1," adding classes "Class1" and "Class2" to the diagram "Diagram1" and to the model "hw1," while initiating a change operation in the form of renaming the diagram "Diagram1" to "ClassesDiag" would be indicated as follows:

Left Differences
Deleted hello word <Class> from hw1 <Model>.Owned Member
Differences associated with hw1::ClassesDiag <Diagram>
Added Class1 <Class> to Diagram1 <Diagram>.Children
Added Class2 <Class> to Diagram1 <Diagram>.Children
Changed Diagram1 <Diagram>.Name from "Diagram1" to "ClassesDiag"
Added Class1 <Class> to hw1 <Model>.Owned Member
Added Class2 <Class> to hw1 <Model>.Owned Member IRSA now groups the individual atomic changes based on this containment structure, such that it does not simply provide a "flat" list of all model elements that were added, deleted, or changed between the two versions of a model being compared, but instead groups them based on their respective parent/container element. The atomic conflicts may then be accepted either individually or "per container," on any level of the hierarchy. During the actual model merge, the user may perform "Accept" and "Reject" operations on the individual differences, or on the groups created from the containment relationships.

As indicated above, because of the peculiarities of model merging in general, and because of varying requirements on the merged model, model merging is in general a manual process. Any fully automatic "fire and forget" solution will invariably either have to be optimized for certain use cases where the requirements are well-defined (and can consequently not be generic) or it will yield inadequate results for the majority of usages. It would be desirable to provide a generic model merge tool with practical relevance such that it provides an interactive user interface that allows the user to compare the models being merged and resolve the conflicts.

Prior solutions unfortunately are complex, and conflict resolution on the level of atomic conflicts is error prone. A common drawback of existing interactive merge approaches relates to a limited ability to recognize individual "atomic conflicts" between the two models being merged. Regardless of the actual paradigm used to present these differences (e.g., an integrated "conflict model" as in the case of the ARIS transformation merge, the "split screen" provided by Oracle's BPA suite, etc.), a common problem of these approaches is that even with a relatively modest number of differences between the models being merged, the user is quickly overwhelmed by their sheer number. As the conflict model in the FIG. 3 example and the corresponding table of atomic conflicts in FIG. 4 illustrate, even comparatively small changes lead to a large number of atomic conflicts that require individual attention by the user. For each such element, the user has to decide what to do with it (e.g., remove it, accept it into the merge result, accept it after modification, etc.), requiring a considerable amount of user attention and opening the door to mistakes.

Furthermore, models often have model elements without a direct graphical representation that can be subject of an atomic conflict including, for example, the container connections described above. Because atomic conflicts of these elements are resolved by the user, as well, technical details from which the user typically is shielded during normal modeling become apparent. The model comparison and merge functionality of IRSA discussed above, for example, makes no effort to shield a non-expert user from the details of how the (graphical) diagrams are represented internally and instead exposes these details, both in the tree view of the models under merge and in the "structural differences" tab. In the latter case, these internal details, and the containment relationships in particular, are actually used to group the differences.

While the atomic conflicts within such a group are related by virtue of being in the same container, there is no grouping based on the actual semantics of the high-level editing operations that were performed to go from the one model to the other. For example, while the two add operations for the classes "Class1" and "Class2" from the IRSA example above are shown within one group (and thus have the same parent node in the "structural differences" tree), the actual addition operations are in general not semantically related. They nonetheless could have been performed completely independently of each other. One familiar with the way models and diagrams are represented internally in IRSA will also note that the classes "Class1" and "Class2" that were added to the (re-named) diagram were not added to the model itself. This indicates that the classes themselves are not actually new, but instead indicates that their addition to the diagram is only the creation of new views on these two classes that had already existed in the original version of the model. This information, however, is not made obvious to the user and instead at best is left to conjecture based on the individual differences, thereby requiring in-depth knowledge of the internal workings of the model representation. While the deficits of IRSA can in part be explained by its different target user group (software engineers instead of business analysts), it shows that IRSA does not help in resolving larger, semantically related groups of differences during merging.

Due to the individual accepting or rejecting of atomic conflicts and consequently the individual deletion or preservation of model elements, it is also possible to make a model invalid during an interactive merge. One example of how this might come about involves "invisible" containment connections such as, for example, the "belongs to" connections between tasks and their lanes. Assume that there exists an object whose merge state was "added in target" that is contained in a container, like the function F2*b* in the FIG. 3 example. The container connection from F2*b* to the containing lane "Alice" carries the same merge state. During manual conflict resolution, a user might accept the addition of F2*b* in the target model but might reject the corresponding container connection (perhaps because the user is not aware of how containment is represented in ARIS). Absent precautions in the merge tool that would reduce the likelihood of such a situation from arising, it is entirely possible to produce an inconsistent model.

Thus, it will be appreciated by those skilled in the art that it would be desirable to provide improved interactive model merging techniques.

In certain example embodiments, a method of resolving model merge conflicts is provided. A conflict model based on a merging together of first and second models is generated via at least one processor. At least one high-level conflict based on the conflict model is detected, with the detecting being performed following said generating. A list of the at least one detected high-level conflict is displayed, along with a visual representation of the conflict model. Each said high-level conflict includes a combination of atomic and/or other high-level conflicts, with each said high-level conflict being classified as either (a) a simple high-level conflict that includes as its constituent(s) a plurality of atomic conflicts, or (b) a complex high-level conflict that includes as its constituent(s) at least one other high-level conflict. A user may resolve the at least one detected high-level conflict after the displaying of the list and the visual representation of the conflict model. According to certain example embodiments, the first model may be a merge target model and the second model may be a transformed model, with the transformed model having been generated by applying a model transformation to a source model.

In certain example embodiments, there is provided a non-transitory computer readable storage medium tangibly storing instructions that, when executed by at least one processor of a system, perform a method as described herein.

In certain example embodiments, a system for resolving model merge conflicts is provided. A conflict model generator is configured to generate a conflict model based on a merging together of first and second models, with the merging being performable via a merge engine. A detector is configured to detect high-level conflicts within the conflict model based at least in part on output from the merge engine. A user interface is configured to display a list of detected high-level conflicts, along with a visual representation of the conflict model. The high-level conflict is of a predefined type, includes constituent conflicts, and either is (a) a simple high-level conflict that includes as its constituent(s) a plurality of atomic conflicts, or (b) a complex high-level conflict that includes as its constituent(s) at least one other high-level conflict. The user interface is further programmed to receive user input enabling a user to resolve detected high-level conflicts. According to certain example embodiments, the system may further comprise a model generator programmed to receive user input enabling the user to create models and define transforms for models.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
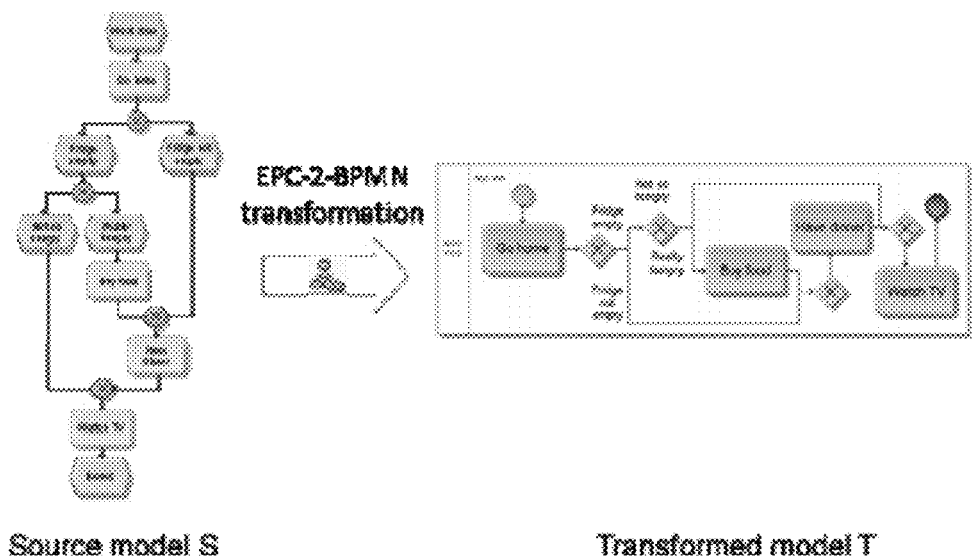
FIG. 1 shows an example business process modeled using the event process chain (EPC) metamodel is transformed into an equivalent process in the Business Process Model and Notation (BPMN) metamodel.
Figure 2:
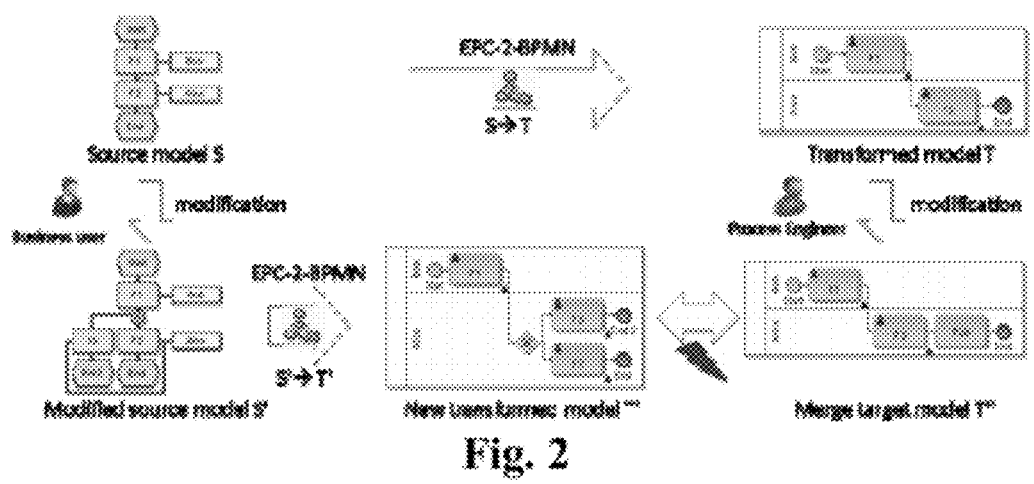
FIG. 2 illustrates an example scenario in which after the creation of the initial transformed model T via a transformation run, the source model S is changed by a business user, yielding a modified source model S', and FIG. 2 also illustrates a concurrent (and possibly incompatible or conflicting) modification of the transformed model T to yield T'', which is different from T' as it is obtained when transforming the modified S'.

Certain example embodiments relate to improved interactive model merging techniques. More particularly, certain example embodiments relate to improved interactive model merging techniques, e.g., based on the ARIS model transformation. Advantageously, certain example embodiments make the model merge more convenient (e.g., such that fewer user interactions are involved in arriving at the desired merge result) and/or more secure (e.g., so as to reduce the likelihood of the unintentional creation of invalid models during merging). It will be appreciated that although certain example embodiments are described in the context of and using examples from the ARIS model transformation merge, the techniques described herein may be implemented in connection with any form of interactive model merge. For instance, the example techniques described herein may be applied to an interactive merge tool using the split screen view (e.g., similar to as in Oracle's BPA Suite). Thus, certain example embodiments may include an integrated conflict model.

More particularly, certain example embodiments use the basic information obtained during merging to help the user resolve high-level merge conflicts. For instance, the different merge states of objects including, for example, those identified above (e.g., equal, changed, added in A/B, conflicting, etc.) and their constellation or grouping in the models being merged, may be used to help recognize high-level merge conflicts. Instead of leaving it to the user to resolve the merge conflicts on the level of the atomic elements (e.g., objects and connections with a non-empty merge state), the recognition of high-level merge conflicts may help capture the semantics of the differences between the models being merged on a larger scale (e.g., covering a possibly very large number of model elements in one conflict) and/or also may generally help allow the user to resolve them easily and quickly within a reduced (and potentially single) number of operations.

In general, high-level merge conflicts may be separated into two broad categories, namely, metamodel-independent high-level merge conflicts and metamodel-dependent high-level merge conflicts. First, metamodel-independent high-level merge conflicts are applicable to models of all kinds of metamodels, as they do not refer to specific types of model elements. They usually do, however, refer to aspects common to many or all metamodels of a modeling system (e.g., all metamodels defined using the same meta-metamodel). Second, metamodel-dependent high-level merge conflicts are specific to certain model types or types of model elements. The example implementation discussed herein focuses more on addressing the metamodel-independent type of high-level conflicts because of their more general applicability. However, it will be appreciated that the techniques described herein may be applied to either or both of metamodel-independent high-level conflicts and metamodel-dependent high-level conflicts.

In certain example embodiments, in the scope of the existing ARIS model transformation interactive merge module, high-level conflict recognition may be performed in a post-processing step on the conflict model $T_C$, e.g., as it is currently produced by the transformation merge tool. As such, high-level conflict recognition may not be performed as an integral part of merging (e.g., during the determination of the merge states of the model elements) in certain example embodiments. This example approach is advantageous in that it leaves the existing simple interactive merge functionality virtually unchanged, while providing the additional advantage that recognizing high-level merge conflicts based on the constellations or groupings of model elements and their respective merge states is considerably simpler when performed on the conflict model $T_C$ than it would be when operating directly on the input models and the sets of objects for the different merge states.

During merging, the user may perform conflict resolution via the high-level conflicts. This allows the user to resolve conflicts that involve many model elements with a single accept or reject operation, instead of going over a large number of atomic conflicts and accepting or rejecting them individually. However, certain example embodiments provide flexibility such that the user is not forced to do the conflict resolution via high-level conflicts, as it sometimes might be desirable to resolve the conflict by producing "something in-between" what would be produced when either accepting or rejecting the high-level conflict as a whole. Therefore, high-level conflicts offer a degree of convenience for standard conflict situations, but still do not prevent a more detailed or manual handling, e.g., for "special cases."

Conceptually, a high-level conflict may be thought of as a structure that has a type and contains other conflicts. These other conflicts may be atomic conflicts, or other simpler high-level conflicts. This nesting of complex conflicts may be arbitrarily deep, at least in theory. In any event, the conflicts contained within a high-level conflict may be split into two groups, namely, sub-conflicts and inverse sub-conflicts. Together, a high-level conflict's sub-conflicts and inverse sub-conflicts may be termed its constituents. When accepting (or rejecting) a high-level conflict, its sub-conflicts are also accepted (or rejected), while its inverse sub-conflicts are rejected (or accepted). Further, a complex conflict may be set to hide its constituent conflicts. Doing so may not only hide the details of the complex conflict, but also may prevent the user from handling the constituents individually. This feature may be particularly advantageous for high-level conflicts where a primary or other purpose is to try to reduce the likelihood of model inconsistencies from being generated.

Different kinds of example high-level conflicts are described in detail below. These types of example high-level conflicts are grouped into either (1) simple high-level conflicts that contain only atomic conflicts as constituents, or (2) complex high-level conflicts that have other non-atomic (and potentially simple and/or complex) conflicts as constituents.

Figures 3, 4:
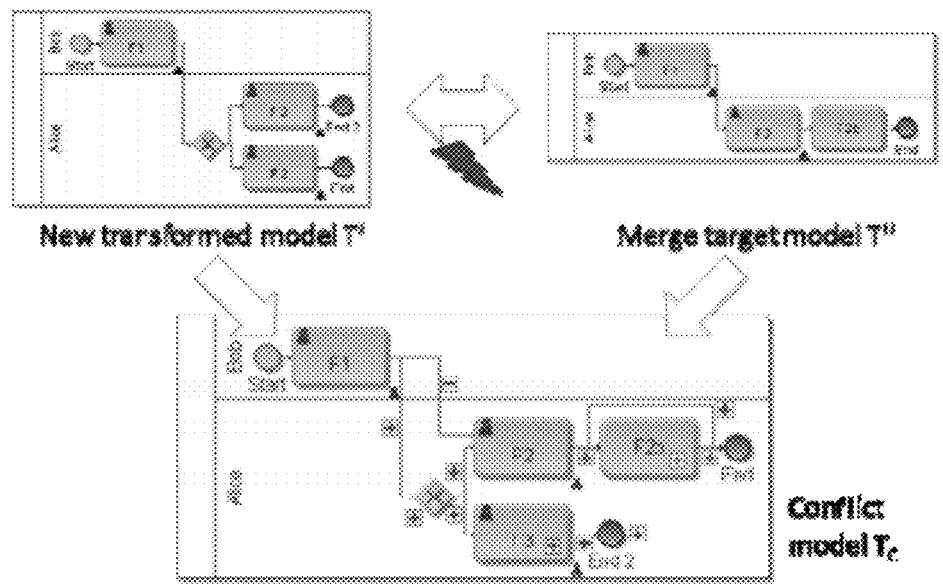
FIG. 3 illustrates a conflict model used as a user interface paradigm to perform interactive conflict resolution.
FIG. 4 is an example conflict table.
Figure 5:
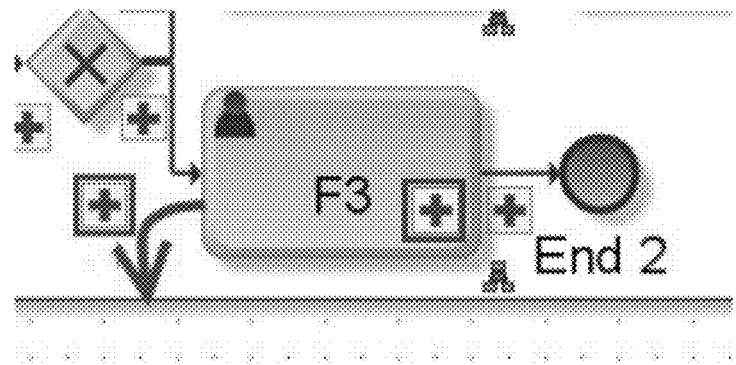
FIG. 5 is an example of the "same state container connection" high level conflict in accordance with certain example embodiments.

A first simple kind of high-level conflict addresses the issues involving the container connections the FIG. 3 example. It has been observed that for an object that has an atomic conflict and that is contained in a container object (e.g., a BPMN task in a lane), its corresponding container connection will have an atomic conflict of the same type. Handling the containee's conflict differently as the conflict of the container connection is somewhat illogical and may possibly violate model integrity. This high-level conflict is applicable regardless of the actual type of the atomic conflicts involved, as long as containee's and the container connection's atomic conflicts are the same. FIG. 5 is an example of the "same state container connection" high level conflict in accordance with certain example embodiments. In the FIG. 5 example, the atomic conflicts were of type "added by transformation." Here, the otherwise invisible "belongs to" container connection is indicated with a red arrow, and the two atomic conflicts involved in this conflict are highlighted (e.g., by virtue of the thicker boxes around the plus signs). If F3 were accepted but the container connection were rejected, the model would become invalid. If F3 were rejected, then the container connection would be implicitly deleted as a connection cannot exist without its source or target objects.

To shield the user from this common kind of conflict and reduce the likelihood of the accidental creation of invalid models, these situations may be identified as a high-level conflict of the type "same state container connection." Both atomic conflicts are added to this conflict as sub-conflicts, and the high-level conflict is set to hide its constituents, thereby disallowing (or at least discouraging) the individual handling of the constituents.

Conflicts often arise through modifications of large sections of the source model or the merge target model. Consequently, it often is the case that there will be groups of directly connected elements that have an atomic conflict of the same type. The "group of connected elements with atomic conflict of same type" high-level conflicts (also referred to herein as a "group conflict" for the sake of brevity) will collect all atomic conflicts of such a group into one conflict, allowing the user to conveniently accept or reject the group as a whole. All atomic conflicts of the group's members are put into the high-level conflict as its sub-conflicts, such that if the high-level conflict is accepted (or rejected) all of its constituents are accepted (or rejected). This kind of high-level conflict may not hide its constituents, to allow the user to optionally make individual accept/reject decisions for its members. This kind of complex conflict also may come in as many variants as there are types of atomic conflicts. Thus, in the case of the current ARIS transformation merge component, three subtypes of "group conflicts" may be provided, one each for members whose conflict type is "added by transformation," "deleted by transformation," or "added in target."

Figure 6:
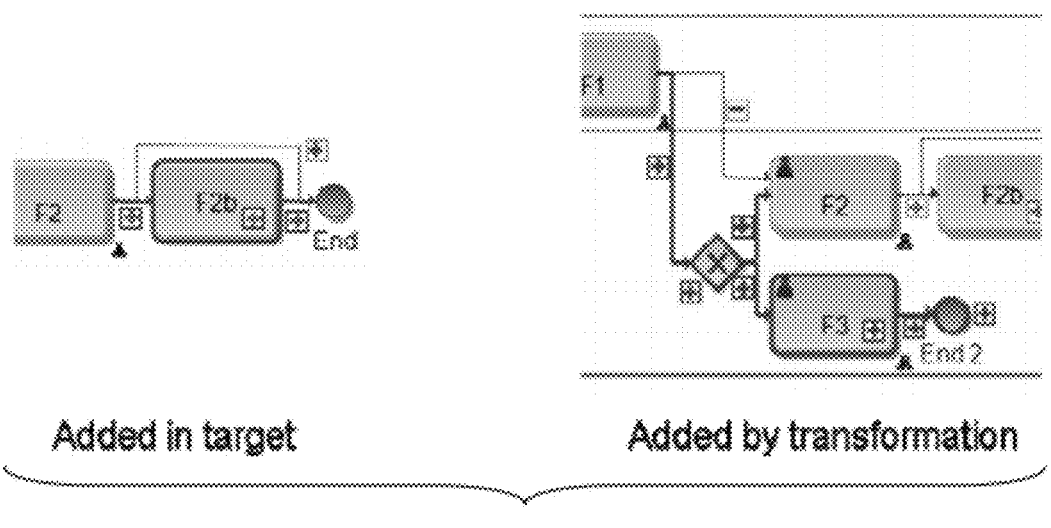
FIG. 6 shows examples of the "group of connected elements with atomic conflict of same type" high-level conflict from the FIG. 3 example conflict model, in accordance with certain example embodiments.

FIG. 6 shows examples of the "group of connected elements with atomic conflict of same type" high-level conflict from the FIG. 3 example conflict model, in accordance with certain example embodiments. One "group of connected elements with atomic conflict of same type" contains elements that were "added in target" and is shown to the left, and another group of elements that was "added by transformation" is shown to the right.

To help avoid trivial high-level conflicts of this type, complex conflicts may not be created for groups whose size is one. Thus, the single connection between F2 and the "End" end event whose state is "added by transformation," as well as the "deleted by transformation" connection between F1 and F2, would not be used to create a group conflict. However, these trivial group conflicts may be used to detect more complex high-level conflicts as described in greater detail below. It also was found that this kind of high-level conflict is more intuitive if groups that span across container connections are not created. If, for example, the "Alice" lane in the FIG. 3 example also had the "added by transformation" state, it would not be added to the group highlighted on the right of FIG. 6.

Figure 7:
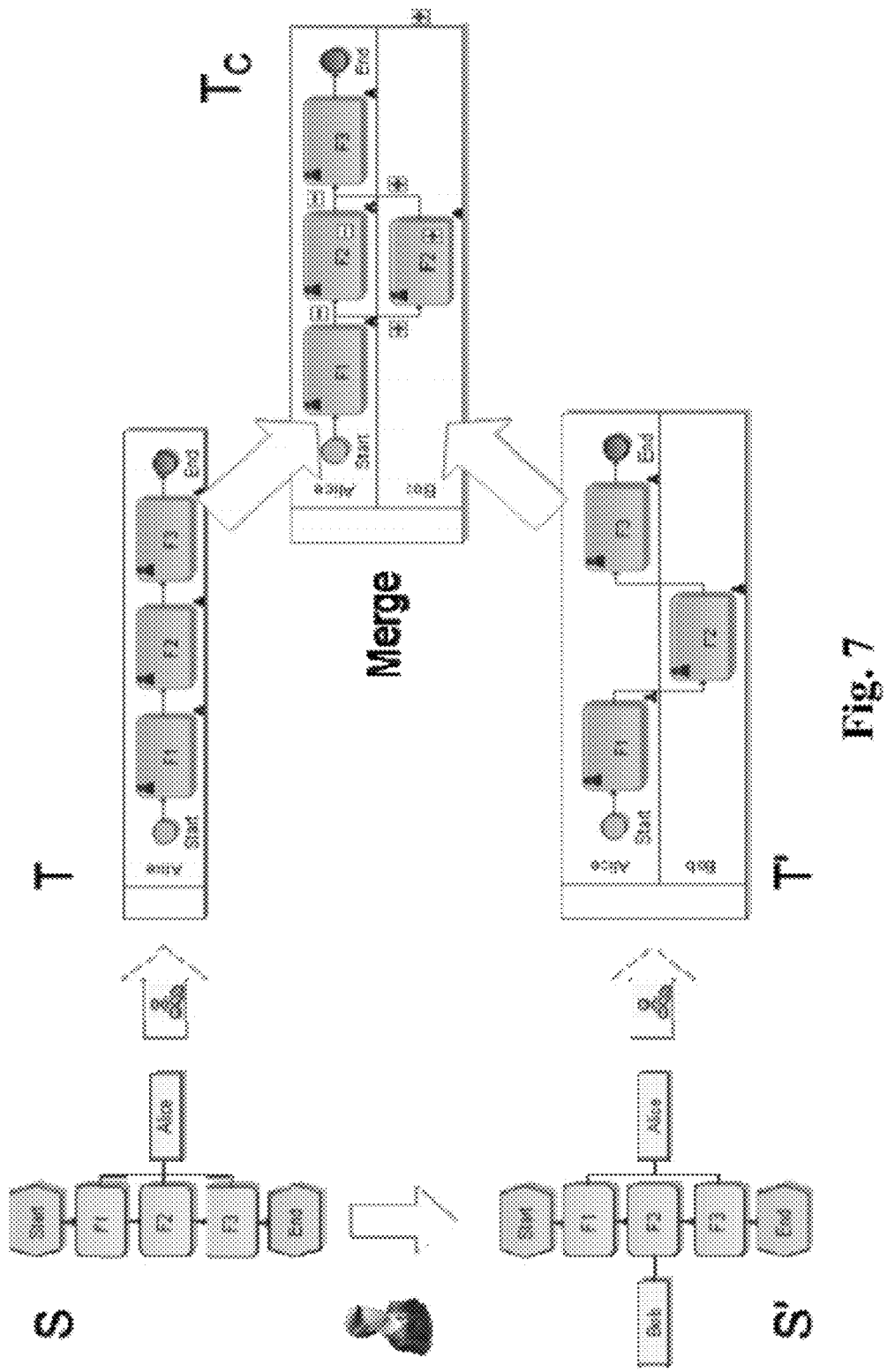
FIG. 7 is an example "simple container change" high-level conflict in accordance with certain example embodiments.

Oftentimes, there are changes in the modified source model S' such that when transforming S' to obtain T', an object F is still created as before but ends up in a different container. FIG. 7, which is an example "simple container change" high-level conflict in accordance with certain example embodiments, shows an example of such a situation. In the original source model S, there are three functions that are all assigned to the same organizational unit "Alice." Consequently, when transforming the EPC to BPMN to obtain model T, all tasks created from the functions end up in the same lane for "Alice." If the business user now adds a new organizational unit "Bob" and assigns F2 to it to obtain the modified source model S', the new transformed model T' will have the task F2 end up in a new lane for "Bob." When merging T' into the unmodified T, the conflict model $T_C$ is obtained, as shown on the right of FIG. 7. Here, it is not possible to merge F2 from T and F2' from T' into a single object, as they need to be displayed in different containers to illustrate the differences, despite the fact that object F2 was not changed from S to S'. Consequently, the conflict model contains a large number of atomic conflicts, despite only one element changing its container. The problem is perhaps exacerbated because the naming of atomic conflicts may be somewhat misleading. Despite the fact that F2, or the connections from F1 to F2 and from F2 to F3 were not touched in the source model, they are shown as being "added by transformation" and "deleted by transformation," which can be quite confusing to the user.

Figure 8:
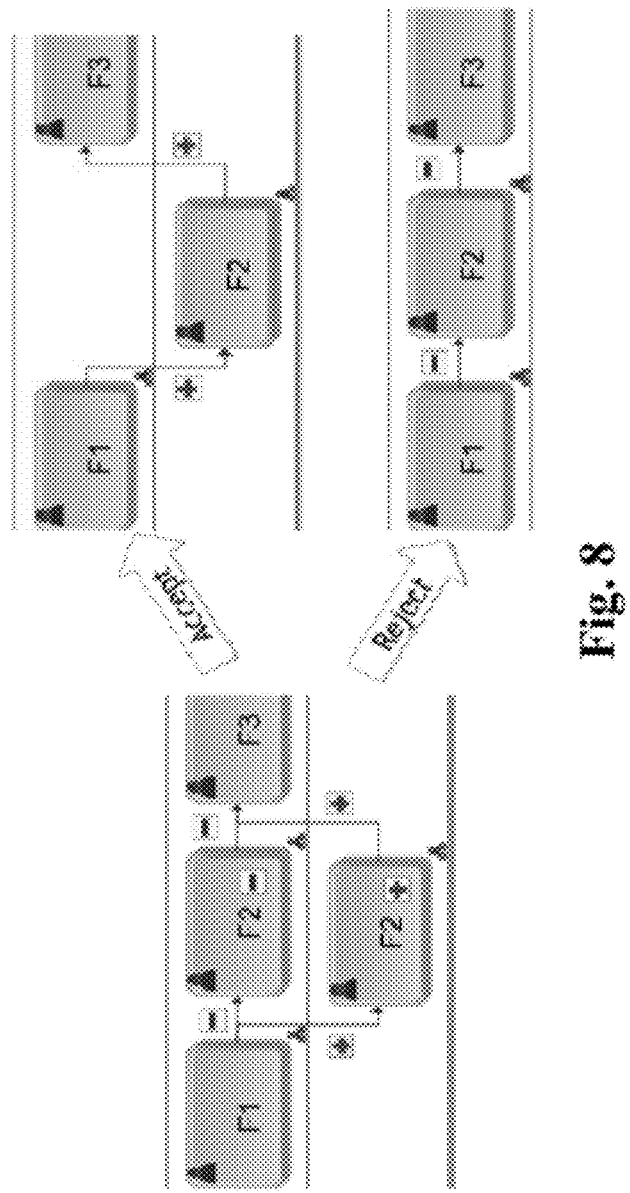
FIG. 8 is an illustrative resolution of the example "simple container change" high-level conflict from FIG. 7.

To identify this common situation as a high-level conflict to aid the user, it may not be possible to rely on the atomic conflicts alone. Rather, additional information may be stored concerning the reason for two objects not matching when the $map_{TT'}$ is created. If the reason was merely a change in the container, the two objects may be stored as an "almost matching" pair. When post-processing the conflict model, it is possible to identify this situation and create a "simple container change" high-level conflict, which contains the "deleted by transformation" atomic issue involving the original task F2 and the new "added by transformation" atomic issue involving the new task F2 as its sub-conflict. It will be appreciated that if the merge state of one of the constituents was "added in target," it would be added as inverse sub-conflict. This advantageously allows the user to recognize what actually happened in the source model, in spite of the atomic merge states being potentially confusing. The user may either accept or reject the high-level conflict, leaving F2 in either the "Bob" or "Alice" lane, respectively, as shown in FIG. 8, which is an illustrative resolution of the example "simple container change" high-level conflict from FIG. 7.

However, when accepting (or rejecting) this complex conflict, the user may manually accept (or reject) the remaining atomic issues on the connections of the remaining F2. An example high-level issue that addresses this problem is discussed in greater detail below.

Figure 9:
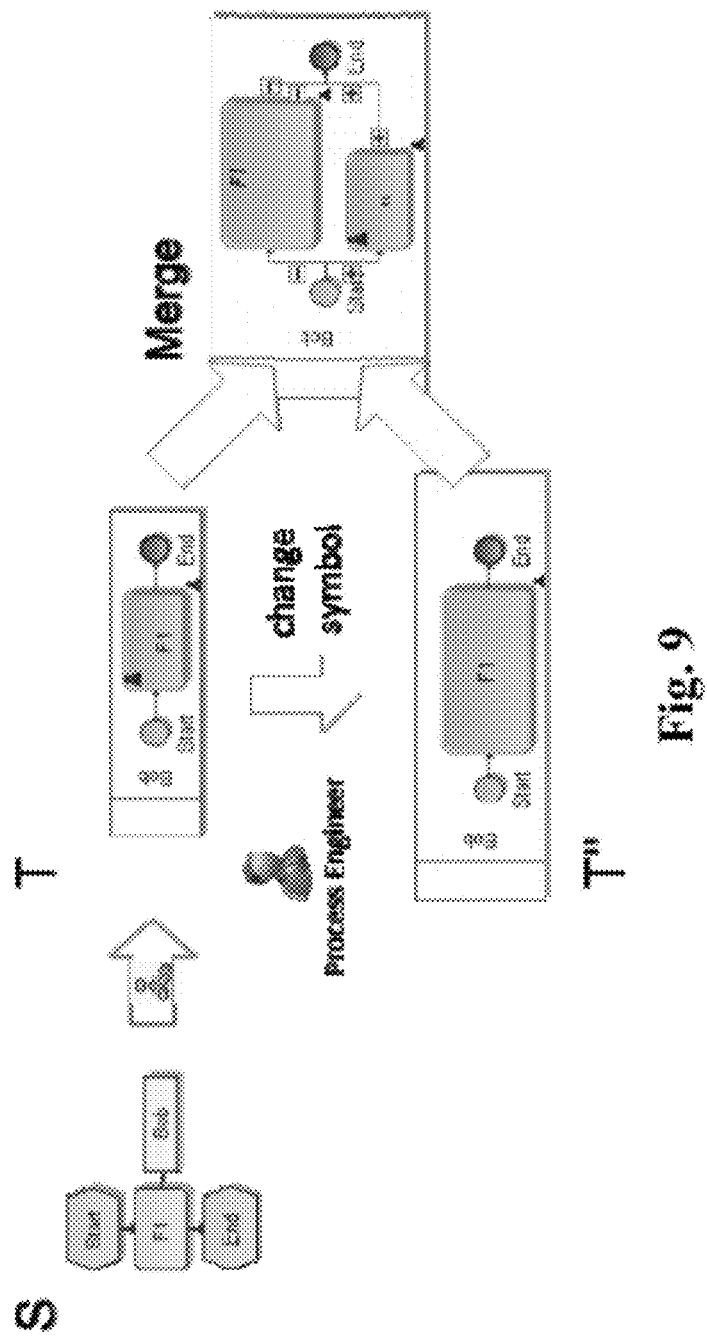
FIG. 9 is an example "simple symbol change" high-level conflict pertains to the changing of symbols in accordance with certain example embodiments.
Figure 10:
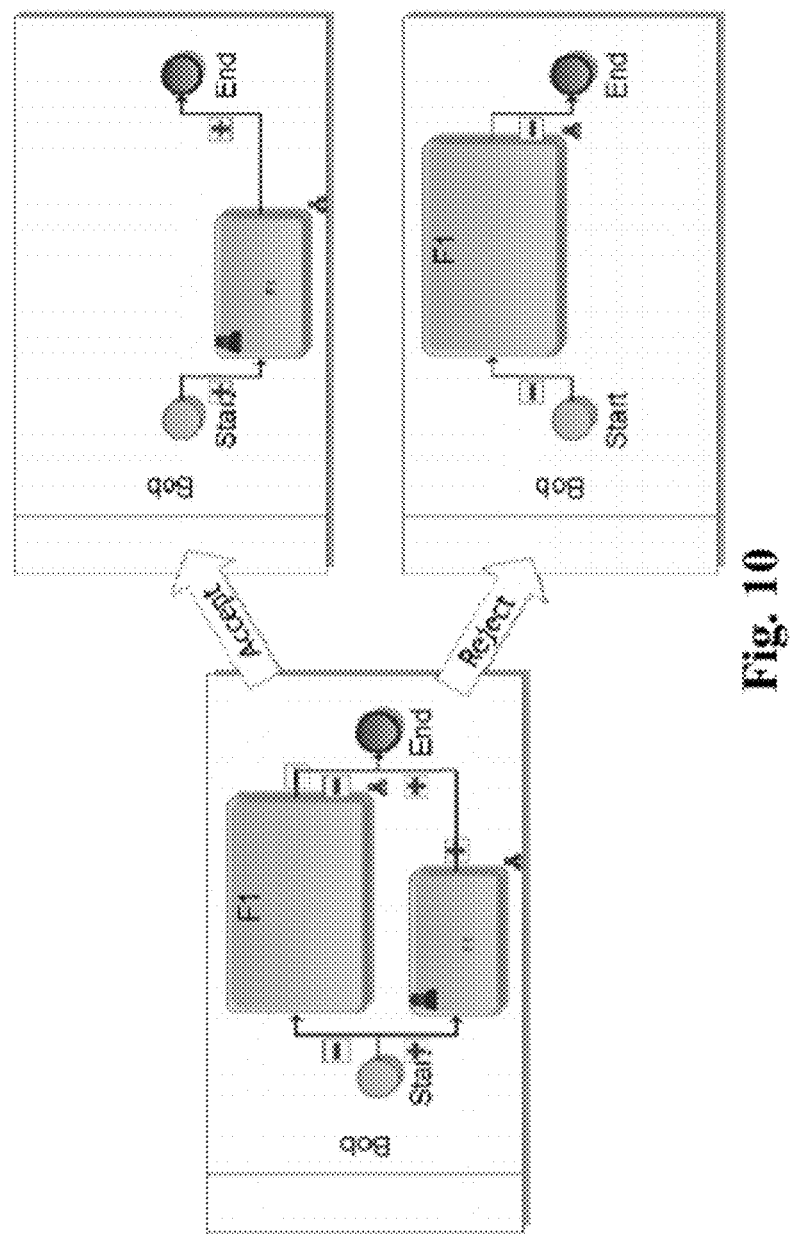
FIG. 10 is an illustrative resolution of the example "simple symbol change" high-level conflict from FIG. 9.

A problem similar to the one addressed by the "simple container change" high-level conflict pertains to the changing of symbols. When creating $map_{T'T''}$, two objects that agree on their trace information, their container, and their object type, but disagree on their symbol type, are considered as being not mergeable. An example of such a conflict is shown in FIG. 9. In the transformed model T', the symbol of F1 was changed from "user task" to "sub-process" by the process engineer to obtain model T'', which is a common operation when a task needs to be detailed on the technical level. Consequently, in the conflict model, F1 is shown twice, once with a "user task" symbol as "added by transformation" and as "deleted by transformation" with the sub-process symbol. As with container changes, this minor change may lead to many atomic conflicts, which may be further aggravated by the somewhat non-intuitive naming. Similar to the "simple container change" high-level conflict above, information may be stored indicating that the sole reason for the two F1 not being equal is the different symbol when building $map_{T'T''}$. As before, this information may be used during post-processing and may allow the "simple symbol change" high-level conflict to be identified. Here, it contains the two atomic conflicts for the two versions of F1 as its sub-conflicts. This perhaps more reasonably named high-level conflict allows the user to quickly determine what actually happened from T to T''. FIG. 10 illustrates how this high-level conflict may be used to resolve a symbol change. For instance, by accepting it, the "user task" variant of F1 is preserved and its merge state removed, while the sub-process F1 is deleted. When rejecting it, the user task F1 is deleted and the sub-process F1 is preserved and has its merge state removed. The atomic conflicts on the connections to and from the variant of F1 that is taken into the result may be manually resolved. A more advanced high-level conflict that allows these atomic conflicts to be handled more conveniently is described below.

As indicated above, it also is possible to have more advanced metamodel-independent high level conflicts. For example, the "replacement in source model" conflict is based on the observation that there often are group conflicts close to each other that have opposing merge states and that result from the same basic editing operation. To better capture the concept of "being close to each other," the border of a group may be defined as the set of model elements that are reachable directly by any of the group's members, but which itself has a different merge state or no merge state at all. The border without containment of a group may be defined as those elements of its border that are not container connections.

For example, in the FIG. 3 example, the "deleted by transformation" connection between F1 and F2 is a trivial group conflict in the sense that it might be filtered out by itself and not directly shown to the user. Consider also the "added by transformation" group conflict shown to the right of FIG. 6.

Figure 11:
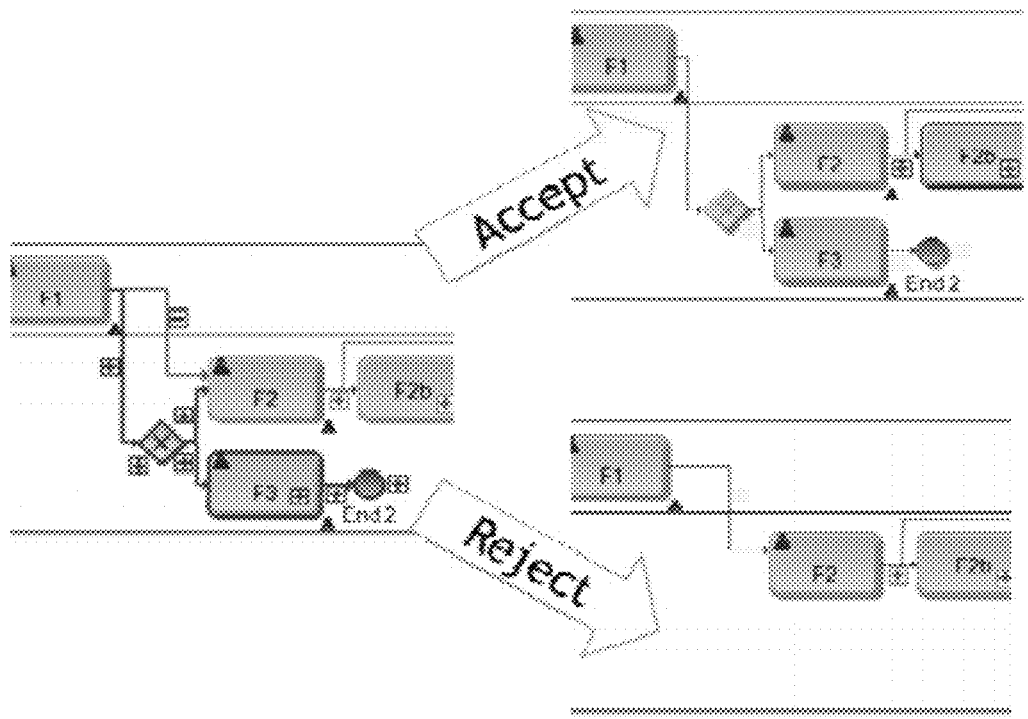
FIG. 11 is an example "replacement in source model conflict" advanced high-level conflict, as well as the two possible outcomes of accepting or rejecting it, in accordance with certain example embodiments.

The connection's border (and also its border without containment) elements are objects F1 and F2. The border elements of the "added by transformation" group conflict are the elements F1 and F2, and the lane Alice. Its border without containment is F1 and F2. Based on this idea, a "replacement in source model" type high level conflict may be defined whenever there are (trivial and non-trivial) group conflicts that have the same set of border without containment elements and where one group is of type "added by transformation" and the other of type "deleted by transformation." This condition holds for the two groups in the example and, thus, a "replacement in source model" conflict is present. Both groups involved in this conflict are added to the high-level conflict as its sub-conflicts, so that they are both accepted (or rejected) if the high-level conflict is accepted (or rejected). Since the accepting of an "added by transformation" conflict means that its corresponding element is preserved, while the accepting of a "deleted by transformation" conflict means that its corresponding model element is deleted, this has the effect that accepting (or rejecting) a "replacement in source model" high-level conflict will keep (or delete) all "added by transformation" elements, and delete (or keep) all "deleted by transformation" elements. This allows the user to conveniently choose between either taking all changes in this section of the model from the modified source model, or discarding them. FIG. 11 is an example "replacement in source model conflict" advanced high-level conflict, as well as the two possible outcomes of accepting or rejecting it, in accordance with certain example embodiments. Because the constituents of this high-level conflict are not hidden, the user is free to accept or reject the constituent group conflicts (or their constituent atomic conflicts) individually to create a merge outcome that is "something in-between" the two extremes offered by accepting or rejecting the replacement in source high-level conflict.

Similar to the "replacement in source model" high-level conflict at least in concept is the "replacement in target model" high-level conflict. One difference is that one of the group conflicts involved is of type "added by transformation" while the other is of type "added in target model." If the borders without containment of two such groups are the same, there is a likely place where elements in T that resulted from the transformation of the original source model S have been deleted when creating T" from T and have been replaced with other elements. In the example, a conflict exists with respect to the group conflict of type "added in target" involving object F2b and its incident connections on the one hand, and the trivial group conflict of type "added by transformation" involving only the connection from F2 to the "end" event on the other hand.

Figure 12:
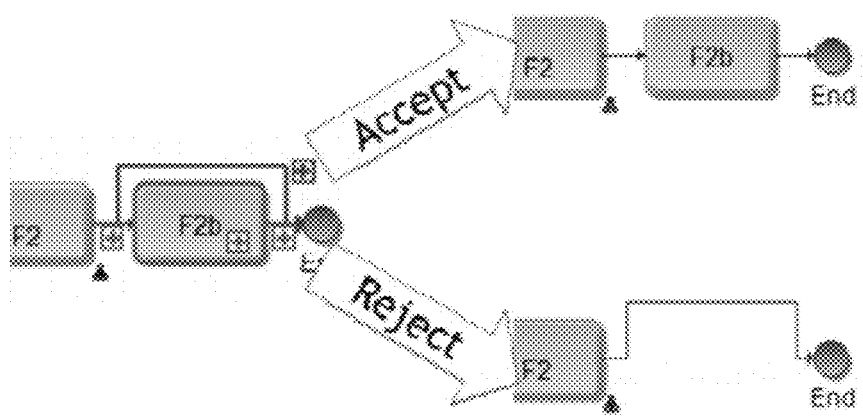
FIG. 12 is an example "replacement in target model" advanced high-level conflict, as well as the two possible outcomes of accepting or rejecting it, in accordance with certain example embodiments.

When such a situation in found the model, a high-level conflict of type "replacement in target model" is created, the group conflict whose type is "added by transformation" is added as its inverse sub-conflict, and the group conflict whose type is "added in target model" is added as its sub-conflict. This has the effect that when accepting (or rejecting) the "replacement in target model" conflict, the original transformed state is discarded (or preserved), and the state created manually in the target model is preserved (or discarded). Thus, the user may quickly decide to accept either one, or the other. Again, the constituents are not hidden, so the user is free to alternatively resolve this conflict differently, either on the level of the constituent group conflicts, or even on the level of the group conflicts' constituent atomic conflicts. FIG. 12 is an example "replacement in target model" advanced high-level conflict, as well as the two possible outcomes of accepting or rejecting it, in accordance with certain example embodiments.

Figure 13:
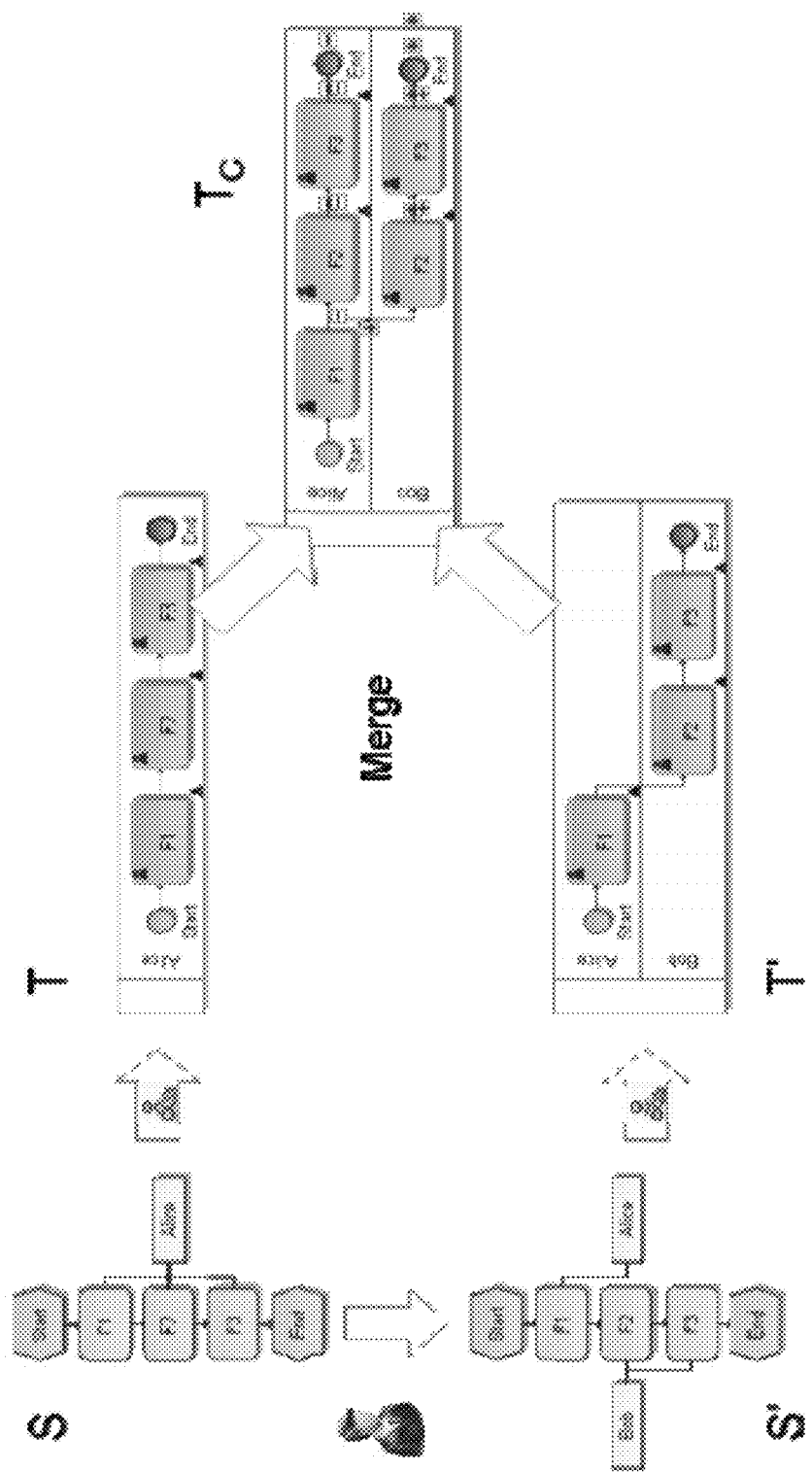
FIG. 13 is an example for a group of container changes.
Figure 14:
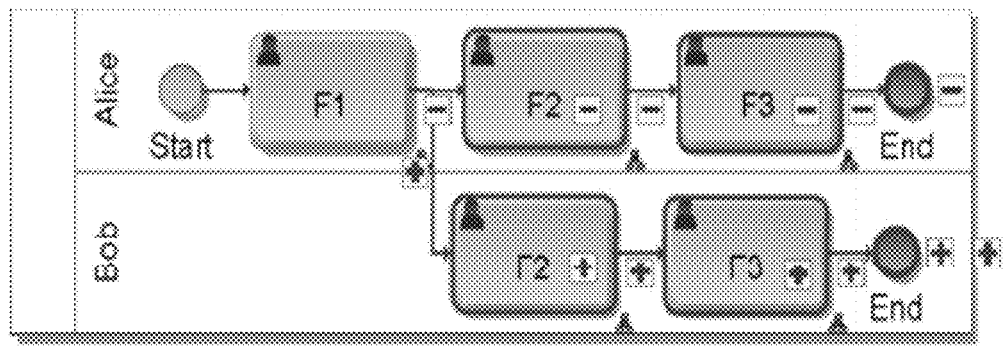
FIG. 14 illustrates the recognition of the "replacement in source conflict" high-level conflict type in connection with the example of FIG. 11.

The concept of using high-level conflicts to enrich the manual merge process with additional information that makes it easier for the user to correctly interpret the atomic conflicts by identifying container or symbol changes as such was discussed above. In the simple high-level conflicts, connections related to those elements whose container or symbol changed would not become part of the conflict and would still need to be resolved manually based on the level of atomic conflicts. This issue may be further addressed by the more advanced "group of container changes" and "group of symbol changes" high-level conflicts. To illustrate these kinds of high-level conflicts, consider the example shown in FIG. 13. Here, the organizational unit responsible for the execution of functions F2 and F3 is changed from Alice to Bob when going from S to S', resulting in the corresponding BPMN tasks to now be placed in a new lane created for the organizational unit Bob. It will be appreciated that the end event is also moved to the new lane, as an event's lane is determined based on the lane of the preceding element. When merging this model T' with the model T as it results from transforming the original source model S, the conflict model $T_C$ is obtained, as shown to the right of FIG. 13. When only considering the high-level conflicts discussed thus far, one "replacement in source" complex conflict that involves both variants of F2, F3, the end events, and the connections between them (highlighted in red in FIG. 14) are first obtained. Three "simple container changed" conflicts are further obtained, one for each pair of F2 tasks, F3 tasks, and the end events. Neither kind of high-level conflict is particularly satisfying, in the sense that the individual "simple container changed" events more correctly reflect the semantics of the changes that happened between T and T". Resolving these conflicts therefore will leave the atomic conflicts of the connections to be resolved manually, as discussed above. The "replacement in source" conflict, on the other hand, conveniently allows for the decision between the original model and the changes coming from S', but does not inform the user about the details of the changes. Similar situations can occur for conflicts caused by symbol changes.

The idea of the "group of container changes" (or "group of symbol changes") is based on the notion that any of the "replacement" high-level conflicts (e.g., either "replacement in source" or "replacement in target")—all of whose objects are part of a "simple container change" (or "simple symbol change") conflict—will have their respective types replaced with "group of container changes" (or "group of symbol changes"), thereby capturing both the precise semantics of the change and reducing the number of manual interactions required.

The list of supported high-level conflicts discussed above is not a comprehensive list of all potential high-level conflicts. It will be appreciated that they instead help illustrate the overall concept of providing a more convenient user experience via a post-processing step that helps recognize higher-level semantics of changes based on the atomic merge states. For instance, while the example high-level conflicts discussed above were independent of a concrete metamodel, they are still dependent on the properties of the modeling platform such as, for example, the nature and the modeling concepts made available by the platform's meta-metamodel. On a modeling platform that uses a meta-metamodel different from ARIS, additional kinds of high-level conflicts may be considered, the ones discussed above might not be applicable, etc. Indeed, as one example, the "same state container connection" high-level conflict may be applicable only if the modeling platform's meta-metamodel supports the concept of containment.

Pseudo-code examples for the detection of high-level conflicts will now be provided. Throughout the pseudo-code snippets, a simplified object model is used to represent models, objects, and connections, as well as the merge issues to be detected. A selection of example helper functions also is provided. The semantics of some helper functions are explained informally in the following description to aid with clarity. It further is assumed that there are a canonical set of primitive data types and a number of abstract data types (e.g., lists and sets) that may be accessed and modified with techniques similar to those that are conventional.

The following is an example simple object structure for models and model elements that may be used in connection with certain example embodiments.

MergeState is an enumeration of all possible merge states an individual model element can have. In this example, the values ADDED_IN_SRC, DEL_IN_SRC, and ADDED_IN_TGT are determined. If a base merge method delivers additional merge states (e.g., if it was able to distinguish an addition of an element in the transformed model from its deletion in the target model), additional values may be added to this enumeration.

HighLvlIssueKind is an enumeration of all currently supported kinds of high-level conflicts. In this example, the values SAME_STATE_CONT_CXN, GRP_ADDED_IN_SRC, GRP_ADDED_IN_TGT, GRP_DEL_IN_SRC, SMPL_CONT_CHANGE, SMPL_SYM_CHANGE, REPL_IN_SRC, REPL_IN_TGT, CONT_CHANGE, and SYM_CHANGE are supported.

An Element is the common abstract superclass of model Objects and connections (Cxn). It may have the following example methods:
  Method MergeState getMergeState ( ): returns the MergeState of the Element if it has one, null otherwise.
  Method Boolean hasMergeState ( ): returns true if the Element has a Merge state, false otherwise.
  Method List getNeighbors ( ): returns the list of Elements that are neighbors of this Element. If the Element is a Cxn, this List will hold the Cxn's source and target Objects. If the Element is an Object, this List will be the union of the Object's inbound and outbound Cxns.
  Method AtomicIssue getElementIssue ( ): returns the single AtomicIssue of this element if it has one, e.g., if hasMergeState ( ) returns true.

Object is the class used to represent all kinds of model objects (e.g., the "nodes" in the models discussed herein). Its superclass is Element. In addition to methods inherited from Element methods, it may have the following methods:
  Method List getInboundCxns ( ): returns the list of Cxns that have this Object as their target object.
  Method List getOutboundCxns ( ): returns the list of Cxns that have this Object as their source object.

Cxn is the class used to represent relationships between model objects. Its superclass is Element. In addition to methods inherited from Element methods, it may have the following methods:
  Method Object getSource ( ): returns the connection's source object (its origin).
  Method Object getTarget ( ): returns the connection's target object (its endpoint).
  Method Boolean isContainerConnection ( ): returns true if the connection connects an object with its container object, false otherwise.

A Model is a class that may have the following methods:
  Method List getAllModelObjs ( ): returns a list of all objects (type Object) within the model.
  Method List getAllModelElems ( ): returns a list of all model elements (type Element) with the model.

A Group is a class that may have the following methods:
  Method List getMembers ( ): returns a reference to the Group's list of member Elements.
  Method List getBorderElements ( ): returns a reference to the Group's list of border Elements.
  Method MergeState getMergeState ( ): getter method for the Group's MergeState (which by definition is the same as the MergeState of all its members).
  Method void setMergeState (MergeState ms): setter method for the Group's MergeState.

An Issue is an abstract superclass used to represent all kinds of merge issues.

An AtomicIssue is a class used to represent atomic issues. Its superclass is Issue and it may have the following methods:
  Method setElement (Element e), which allows the model element addressed by this AtomicIssue to be set.
  Method Element getElement ( ), which is a corresponding getter method to access this element.
  Method MergeState getMergeState ( ): returns the merge state of this atomic issue's corresponding model element.

A HighLvlIssue is a class used to represent all kinds of high-level issues. Its superclass is Issue and it may have the following methods:
  Method List getIssues( ) returns the list of this conflict's issues.
  Method List getInverseIssues( ) returns the list of this conflict's inverse issues.

It will be appreciated that the classes Issue, AtomicIssue, and HighLvlIssue form a variant of the well-known composite design pattern, with the AtomicIssue being the leaf element of the tree structure, the HighLvlIssue being the composite or "inner node," and Issue being the component, or the common superclass of leaf and inner nodes. One difference is that the example structure described herein is a weak form of composition (usually referred to as "aggregation"), since here a composite can be part of several other composites, e.g., the resulting structure is not a tree but a directed acyclic graph (DAG).

The following are example helper functions that may be used in connection with certain example embodiments.
  Function HighLvlIssue createHighLvlIssue (HighLvlIssueKind k, List subIssues, List invSubIssues): creates a new high-level issue of the given HighLvlIssueKind k with the given subIssues and inverse sub-issues (invSubissues) and returns it. For the sake of simplicity, it is assumed that the subIssues and invSubissues lists given may contain either Issues or alternatively directly the model Elements with a merge state, in which case the AtomicIssue of these elements as given by the getElementIssue ( ) method is used.
  Function Boolean is ContainerCxn (Element e): returns true if the given Element e is of type Cxn and is a container connection.

The following are example functions for detecting simple high-level issues in accordance with certain example embodiments.

The following function may be used for detecting "same state container connection" high-level conflicts:

```
Function List detectSameStateContainerCxnConflicts(Model
tc) {
    List sameStateContCxnIssueList = new List( );
    for (Object o: tc.getAllModelObjs( )) {
        MergeState ms = o.getMergeState( );
        for (Cxn c: o.getOutboundCxns( )) {
            if (c.getMergeState( ) == ms && c.isContainerCxn( )) {
                HighLvlIssue issue =
createHighLvlIssue(SAME_STATE_CONT_CXN,
                    new List(o,c), null);
                sameStateContCxnIssueList.add(issue);
            }
        } //end inner for
    } //end outer for
    return sameStateContCxnIssueList;
}
```

The following structures and function may be used for detecting "group conflicts":

```
global List handledElems = new List( );
global List resultGroups = new List( );
Function List detectGroupConflicts(Model tc) {
    List groupIssues = new List( );
    List groups = findSameStateGroups(tc);
    for (Group g : groups) {
        if (g.getMembers( ) .size( )==1) continue;
        HighLvlIssueKind k;
        switch (g.getMergeState( )) {
            case ADDED_IN_SRC: k= GRP_ADDED_IN_SRC;
            case DEL_IN_SRC: k= GRP_DEL_IN_SRC;
            case ADDED_IN_TGT k= GRP_ADDED_IN_TGT;
        }
        HighLvlIssue iss = createHighLvlIssue(k,
g.getMembers( ), null);
        groupIssues.add(iss);
    }
    return groupIssues;
}
Function List findSameStateGroups(Model tc) {
    for (Element e: tc.getAllModelElems( )) {
        if (!handledElements.contains(e) && e.hasMergeState( ))
        {
            fillGroupRecursively(e,null);
        }
    }
    return resultGroups;
}
Function void fillGroupRecursively(Element e, Group g) {
    if (g == null) {
        g = new Group( );
        g.setMergeState(e.getMergeState( ));
        resultGroups.add(g);
    }
    g.getMembers( ) .add(e);
    //container cxns are part of the group, but group ends
here
    if (isContainerCxn (e)) return;
    for (Element n: e.getNeighbors( )) {
        if (!handledElments.contains(n)) {
            handledElements.add(e);
            if (n.getMergeState( ) == g.getMergeState( )) {
                fillGroupRecursively(n, g);
            } else {
                if (!isContainerConnection (n)) {
                    g.getBorderElements( ).add (n)
                }
            }
        }
    }
}
```

To detect "simple container change" (or "simple symbol change") conflicts, during the creation of map$_{T'T''}$, whenever two objects a∈T" and b∈T" are considered as not mergeable only because their container (or symbol) differs, this information is preserved in some way and made it available in some form during high-level conflict detection. In this example implementation, it is assumed that each such pair (a,b) of "almost matching" elements is stored in a list containerMismatch (or symbolMismatch) and that these lists are made available during high-level conflict detection. The following example functions may be used in certain example embodiments:

```
Function List detectSimplePropertyChangeIssues(Model tc,
    List containerMismatch, List symbolMismatch) {
    List propertyChangeIssues = new List( );
    for (Pair p : containerMismatch) {
        propertyChangeIssues.add(
createSimplePropertyChangeConflict(p,SMPL_CONT_CHANGE))
    }
    for (Pair p : symbolMismatch) {
        propertyChangeIssues.add(
            createSimplePropertyChangeConflict(p,SMPL_ SYM
_CHANGE));
    }
    return propertyChangeIssues;
}
Function HighLvlIssue
createSimplePropertyChangeConflict(Pair pair,
    HighLvlIssueKind t) {
    List subIssues = new List(pair.getFirst( ));
    List invSubIssues = new List( );
    if (pair.getSecond( ) .getMergeState( ) == DEL_IN_SRC) {
        subIssues.add(pair.getSecond( ));
    } else {
        invSubIssues.add(pair.getSecond( ));
    }
    returncreateHighLvlIssue(t, subIssues, invSubIssues)
}
```

With respect to the detection of "replacement in source," "replacement in target," "group of container changes," and "group of symbol changes" conflicts, for the sake of simplicity, the nesting of group conflicts is ignored as they are detected for incorporating into the replacement conflicts and instead the example group creation methods may be used. The "upgrading" of the replacement conflicts into "group of container changed" and "group of symbol changed" conflicts may be incorporated into this detection method. The detection of "simple container change" and "simple symbol change" conflicts as described above may be done before the function is invoked. Via two straightforward helper methods, a test may be performed to determine whether all object members of the replacement conflict are part of either a "simple container change" or a "simple symbol change" conflict. If this is the case, the type of the high-level issue is changed accordingly. Thus, the following example functions may be implemented in certain example embodiments:

```
Function List detectReplacmentIssues(Model tc) {
    List replacementIssues = new List( );
    List groups = findSameStateGroups(Model tc);
    for (Group outer : groups) {
        for (Group inner : groups) {
            if (outer == inner) continue;
            if(outer.getBorderElements( ).containsAll(
inner.getBorderElements( )) {
                List subIssues = new List( );
                List invSubIssues = new List( );
                HighLvlIssueKind k;
                if (outer.getMergeState( )==ADDED IN SRC &&
                    inner.getMergeState( )==DEL_IN_SRC) {
                    subIssues.addAll(outer.getMembers( ));
```

```
        subIssues.addAll(inner.getMembers( ));
        k = REPL_IN_SRC;
    } else if (outer.getMergeState( )==ADDED_IN_SRC &&
            inner.getMergeState( )==ADDED_IN_TGT) {
        subIssues.addAll(outer.getMembers( ));
        invSubIssues.addAll(inner.getMembers( ));
        k = REPL_IN_TGT;
    }
    if
(areAllObjIssuesInSimpleContChngeConfl(subIssues) &&
        areAllObjIssuesInSimpleContChngeConfl(invSubIssues))
{
        k = CONT_CHANGE;
    } else if
(areAllObjIssuesInSimpleSymChngeConfl(subIssues) &&
areObjIssuesObjsInSimpleSymChngeConfl(invSubIssues)) {
            k = SYM_CHANGE;
        }
        replacementIssues.add(
            createHighLvlIssue(k, subIssues, invSubIssues));
    } //end if
  } //end inner for
 } //end outer for
 return replacementIssues;
}
```

To "glue together" the different example detection methods discussed above, some or all of the detection functions may be invoked from a single function that receives (or is passed) the conflict model, as well as the lists of model elements that were not mergeable because of container or symbol mismatches as parameters. This technique collects the lists of high-level issues as they are returned by the issue-type specific detection methods in a single list, which may be returned as a result of the detection process and passed to the client. The client displays them (e.g., in a suitable user interface) and allows the user to go over all high-level issues and accept or reject them, or alternatively to handle them differently based on their constituent conflicts. An example function is provided below:

```
    Function List detectHighLvlIssues (Model tc, List
containerMismatch,
    List symbolMismatch) {
        List highLvlIssues = new List( );
highLvlIssues.addAll(detectSameStateContainerCxnConflicts(tc));
        highLvlIssus.addAll(detectGroupConflicts(tc));
    highLvlIssus.addAll(detectSimplePropertyChangeIssues(tc,
        containerMismatch, symbolMismatch));
        highLvlIssus.addAll(detectReplacmentIssues(tc));
        //. . . additional methods for detecting other kinds of
high-level
    // issues could be added here
        }
```

Figure 15:
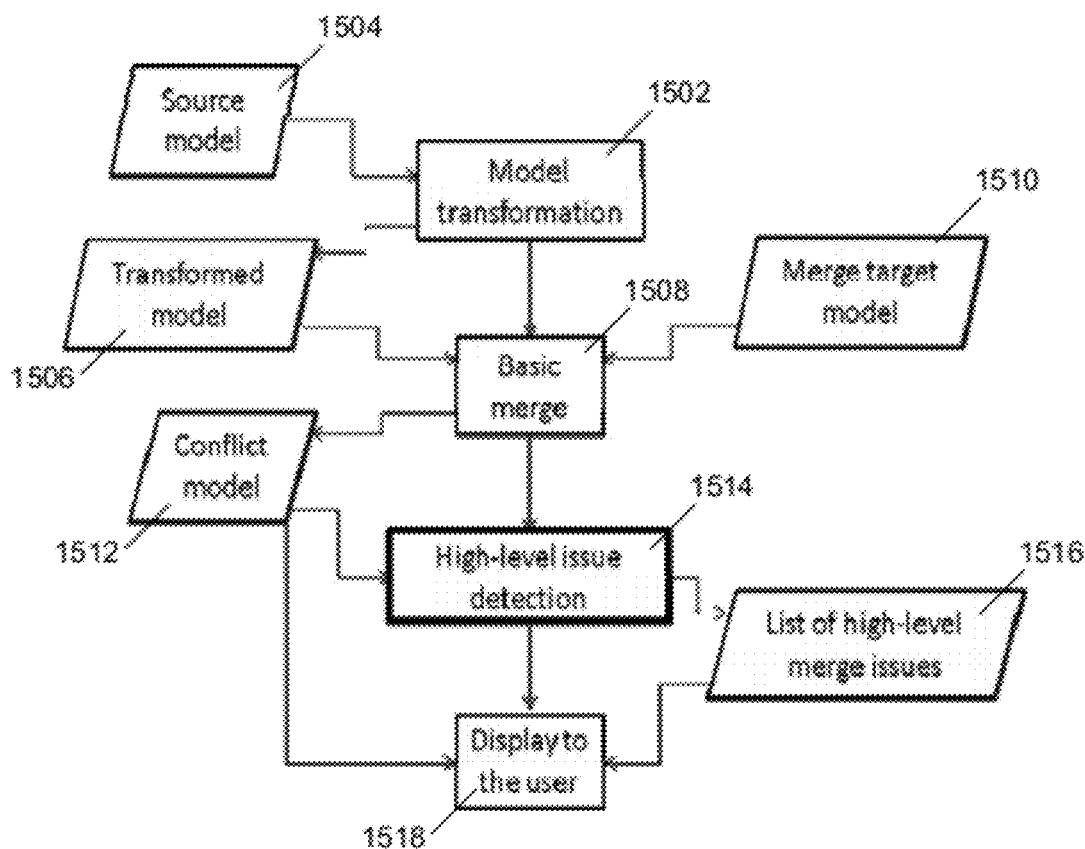
FIG. 15 is an illustrative flowchart demonstrating how the conflict resolution techniques described herein may fit into an example overall transformation and merge process, in accordance with certain example embodiments.

FIG. 15 is an illustrative flowchart demonstrating how the conflict resolution techniques described herein may fit into an example overall transformation and merge process, in accordance with certain example embodiments. In FIG. 15, the model transformation 1502 is used to transform the source model 1504 into a transformed model 1506. The basic merge functionality 1508 that already existed as part of the transformation component is used to merge the transformed model 1506 with the merge target model 1510 (which is a model that was created with the model transformation 1502 from a different version of the same source model 1504), yielding the conflict model 1512. The conflict model 1512 is a model where all elements that could be merged successfully are shown only once, all elements that were added or deleted in either the transformed model or the merge target model are shown, and where the kind of change (added in source, added in target, etc.) is indicated with a merge state attribute. Receiving this conflict model 1512 as input (together with possible additional information, e.g., about the pairs of "almost matching" objects—different only regarding container or symbol—involved in detecting symbol or container change conflicts), the high-level merge issue detection 1514 then applies the example techniques described herein, yielding a list of high-level merge issues 1516, which are then presented to the user together on a display 1518 with the conflict model 1512, allowing the user to conveniently resolve the high-level issues by accepting or rejecting them, or digging deeper into the details (e.g., the atomic issues) of the issues where necessary or desirable.

Although certain example embodiments are connected with the model transformation in that that the transformation is used to obtain the two models being merged (the transformed model 1506 and merge target model 1510 in FIG. 15, for example), different embodiments may function independent of how the two models being merged are created. That is, the techniques described herein may apply when a corresponding basic merge functionality or other technique is able to identify which elements in the two models are mergeable and which are not, produce a conflict model as described above, and identify merge states that are the same as or similar to those discussed herein for those elements that are not mergeable.

Figure 16A:
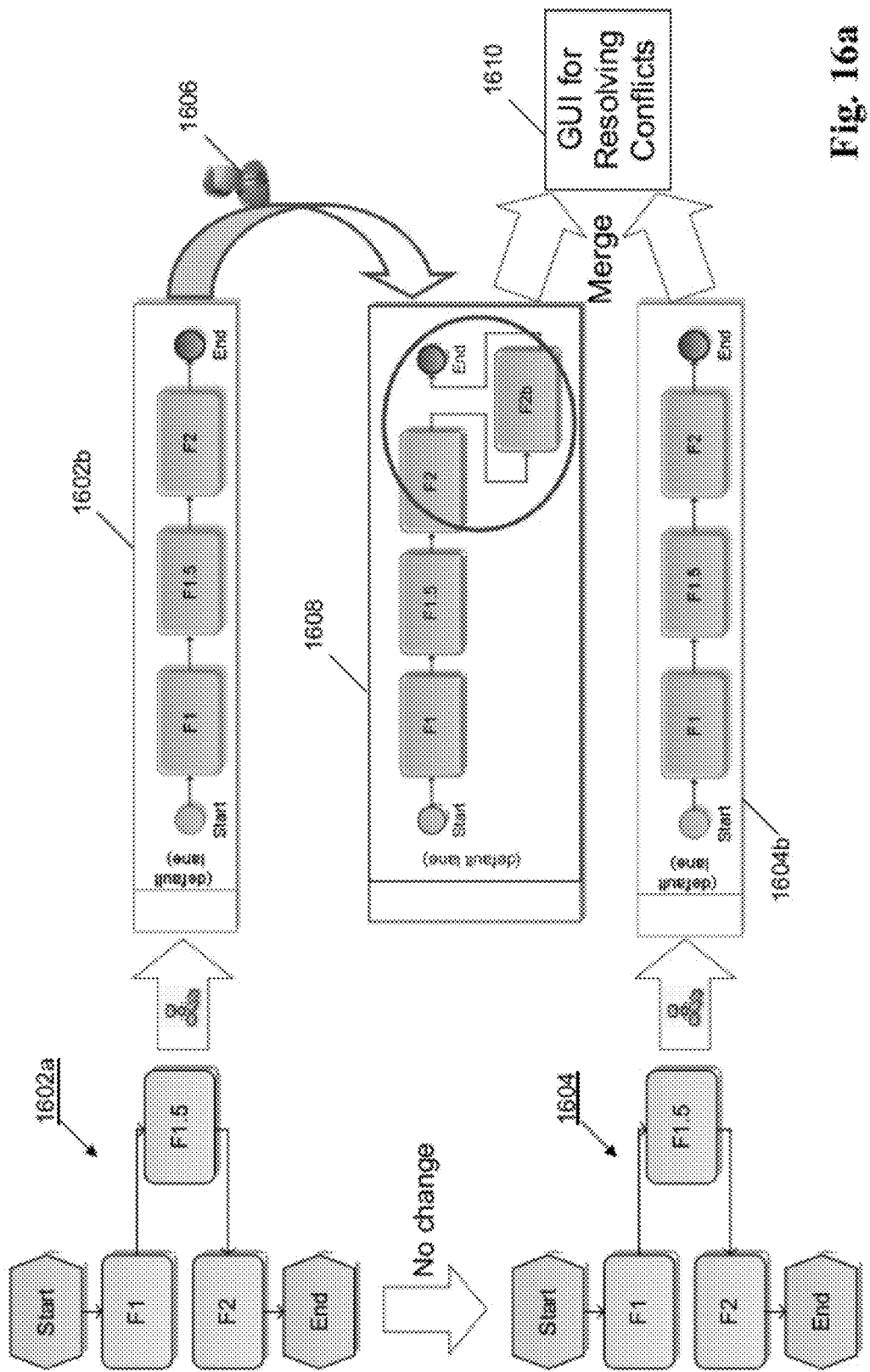
FIGS. 16*a-c* demonstrate how the conflict resolution techniques described herein in accordance with an example embodiment.
Figure 16B:
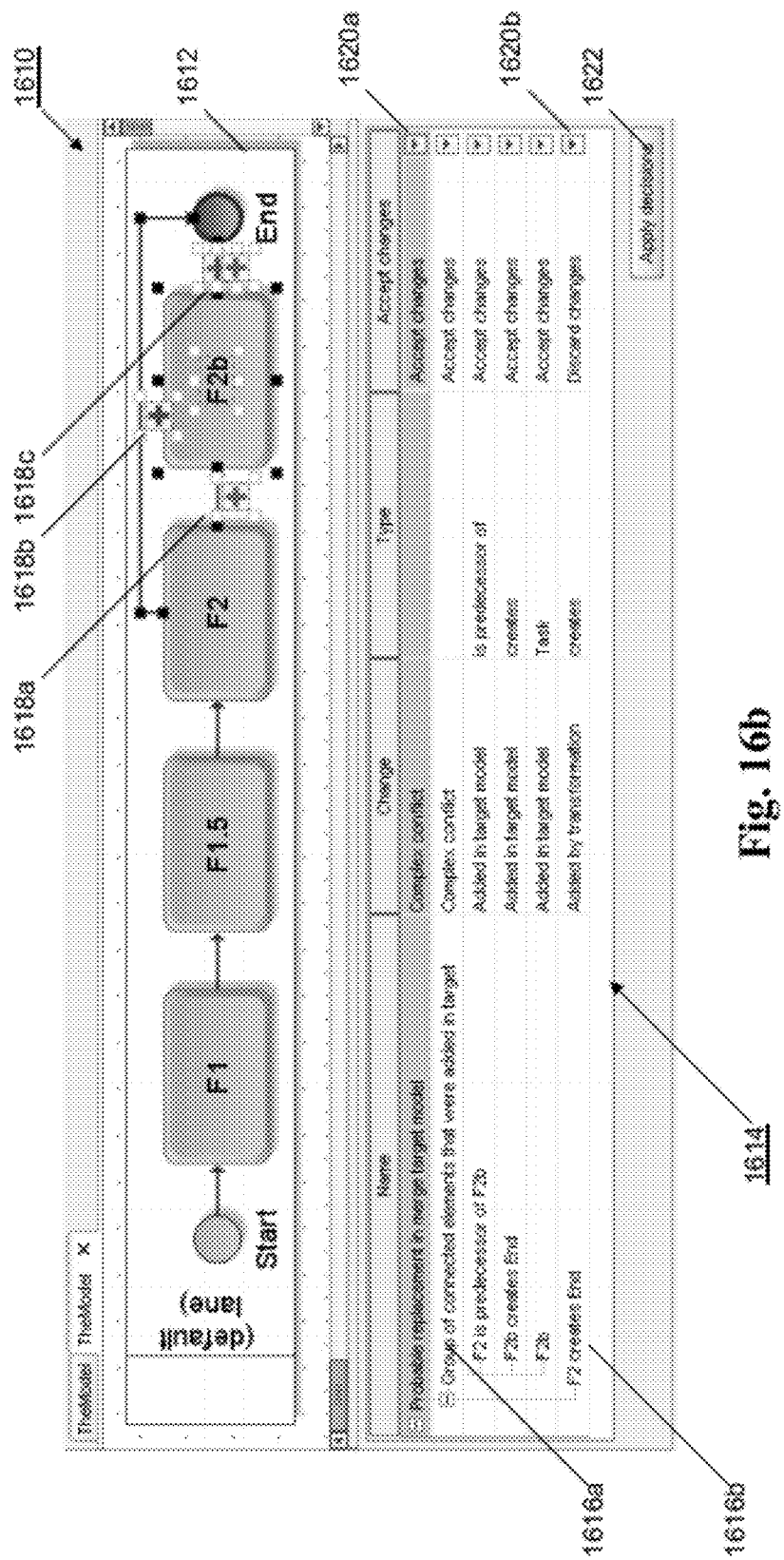
Figure 16C:
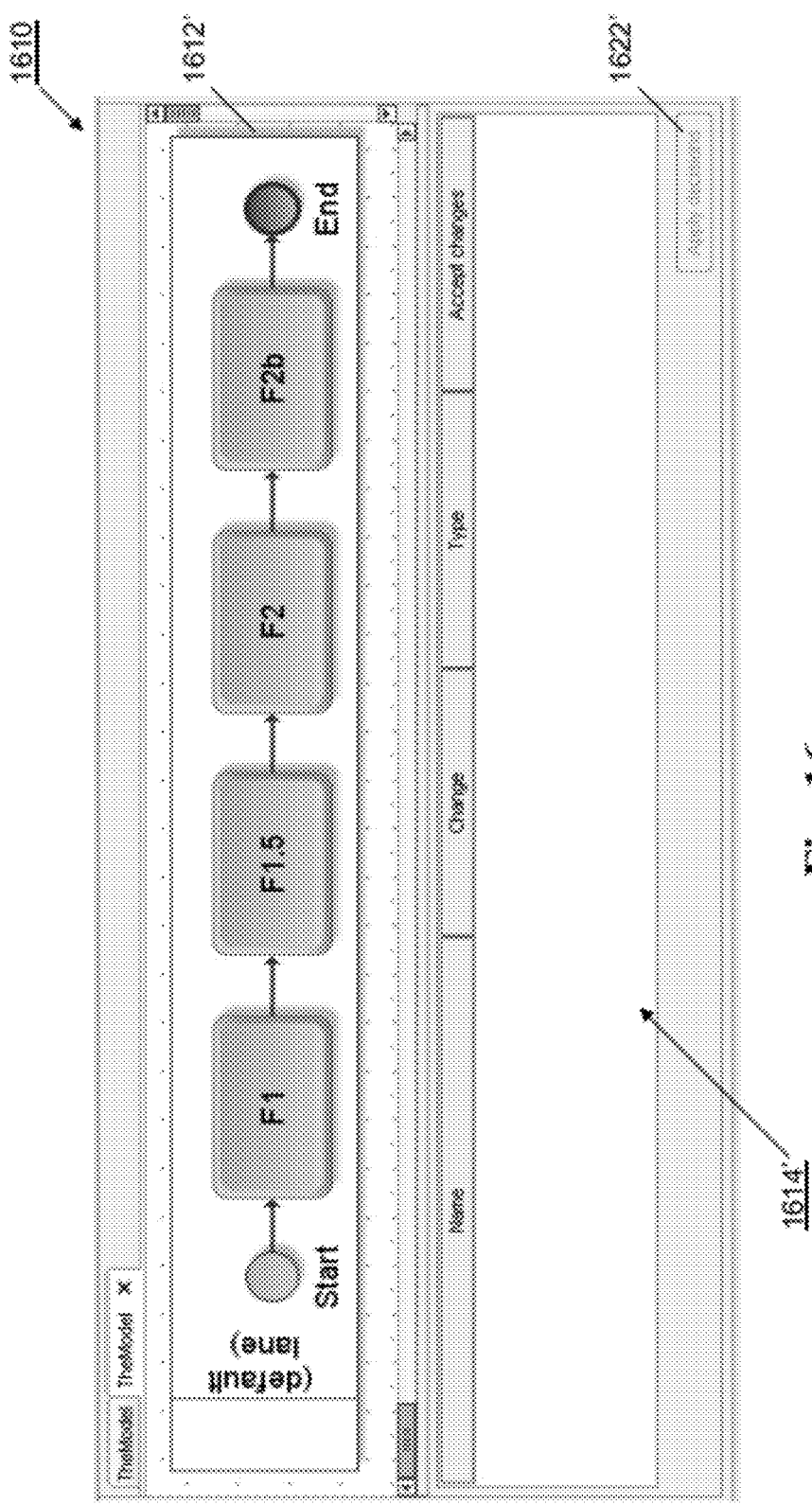

FIGS. 16a-c demonstrate how the conflict resolution techniques described herein in accordance with an example embodiment, and thus are similar to FIG. 15. However, In FIG. 16a, a source model 1602a is specified, as is a target model 1604b. The source and target models 1602a and 1602b include functions F1, F1.5, and F2, in that order, between start and end events. Although there is no change between the source model 1602a and the target model 1604b in the FIG. 16a-c example scenario, it will be appreciated that this is not a requirement of all scenarios. The source model 1602a and the target model 1604a are represented as in an ARIS-compatible source and target model representations 1602b and 1604b, respectively, e.g., such that the start and end points, as well as the functions, are located within a single default swim lane.

In the FIG. 16a example, a process engineer 1606 makes certain changes to the source model representation 1602b (e.g., after the transformation). More particularly, the process engineer 1606 deletes the connection between the function F2 and the endpoint, adds function F2b, and adds connections between function F2 and function F2b, as well as between function F2b and the endpoint. The transformed model 1608 includes these changes within the circled area. However, as will be appreciated, there is now a conflict between the transformed model 1608, and the target model 1604 and the target model representation 1604b. A merging process identifies high-level conflicts and displays them in a graphical user interface (GUI) 1610, which enables a user to resolve them.

FIG. 16b, in particular, shows one an example GUI 1610 in accordance with certain example embodiments. The GUI 1610 shows the conflict model 1612, along with a list of high-level conflicts 1614. The list 1614 includes a name for the conflict, as well as a type of change that caused the conflict, a type of conflict, and a selection area allowing the user to specify whether a change is to be accepted or rejected. More particularly, the list 1614 includes constituent "normal"/"standard" issues and inverse sub-issues. An example constituent issue 1616a in the list 1614 is the complex conflict that results from the grouping of connected elements that were added. This example complex conflict change includes multiple sub-issues for resolution. An inverse constituent issue 1616*b* also is provided in the list 1614. Graphical representations for at least some of these issues 1618*a-c* are shown in the conflict model 1612. In any event, the user may decide whether to accept or reject the changes as grouped or on a more refined sub-issue level. In the FIG. 16*b* example, the user decides to accept 1620*a* the issue 1616*a*. This decision thus involves the acceptance of all "normal"/"standard" sub-issues, as well as the discarding 1620*b* of the inverse sub-issue. These changes may be committed by pressing the apply decisions button 1622. It will be appreciated that accept/discard decisions may be made on a more granulated (e.g., atomic) basis in certain example embodiments. Additionally, or in the alternative, in certain example embodiments, changes may be accepted/discarded in series, e.g., such that it becomes possible to "roll back" or undo changes over time.

The result of the committing of the changes is shown in FIG. 16*c*. As can be seen, the list 1614' is now empty, as there are no outstanding conflicts to be addressed. The conflict model 1612' is similarly clear of visual indications of outstanding conflicts. The apply decisions button 1622' is disabled, there being no changes available for committing.

Certain example embodiments implement an approach that uses detection methods written in a Turing-complete programming language to perform the detection of high-level issues. As a result, many different kinds of high-level issues may be detectable using the techniques described herein (especially if performance considerations and aspects such as code maintainability are set aside), provided that the information needed is present in the conflict model and any additional information is passed as input from the respective basic merge method. The selection of high-level issues presented herein should not be considered as a definitive and/or complete list of all possible high-level issues, but rather should be viewed as being a set of issues that are fairly commonly encountered issues that typically need resolution. As will be appreciated from the above, high-level issues that were independent of the actual type of model being merged have been described herein.

New use cases and practical experience with the initial prototype may in certain instances help identify new kinds of high-level issues for which corresponding detection code could be added. The approach of using code for detection allows for the detection of many (and possibly all) kinds of high-level conflict, regardless of how specific it is to certain use cases or model types.

The use of programming to specify what situations in the conflict model constitute a certain kind of high-level issue advantageously provides for flexibility. Common programming techniques for code extensibility may be used in certain example embodiments to provide corresponding extension points to the example techniques herein, e.g., allowing for the addition of new detection functions without changes our code.

Although certain example embodiments enable a choice of either accepting or rejecting a detected high-level issue, certain example embodiments may provide an "in-between" choice. Thus, although certain example embodiments may involve a user looking into the high-level issue's constituent conflicts and potentially ultimately ending up at the level of atomic conflicts again that may need to be resolved by accepting or rejecting them, different embodiments may provide a more intermediate or customizable approach at the outset beyond simply accept/reject decisions.

Further, in certain example embodiments, the accepting or rejecting of a high-level issue may be translated into a recursive accept (and reject) or reject (and accept) operations on its constituent issues (and inverse constituent issues), leading to accept or reject operations on the atomic issues. Thus, for the set of atomic issues considered herein, a conflict resolution may involve keeping (and "untagging" or removing the merge state) or deleting the model elements involved in the constituent atomic conflicts.

Of course, it is possible to add new kinds of atomic issues to the techniques described herein including, for example, changes of an element's attribute that could be represented by a "delta" merge state and that could carry the original and the new value of the attribute, etc. Here, accepting would mean that the new value is taken into the result, while rejecting it would preserve the old attribute value.

Regardless, certain example embodiments may involve either taking the elements (or element properties and attributes) from the transformed model or those from the merge target model into the result (but in almost arbitrary combinations). It may not always be possible, for example, to create new model elements that did not appear in either model, or change the value of a model element property into a value other than the one coming from one of the models being merged based on the techniques described herein. To provide such functionality could involve the addition of some form of scripting functionality, e.g., where snippets of model manipulation operations could be added to a high-level issue that could then be performed if the issue is accepted (an "accept script") or rejected (the "reject script"). Such an extension of the techniques described herein may be implemented in connection with different embodiments.

Figure 17:
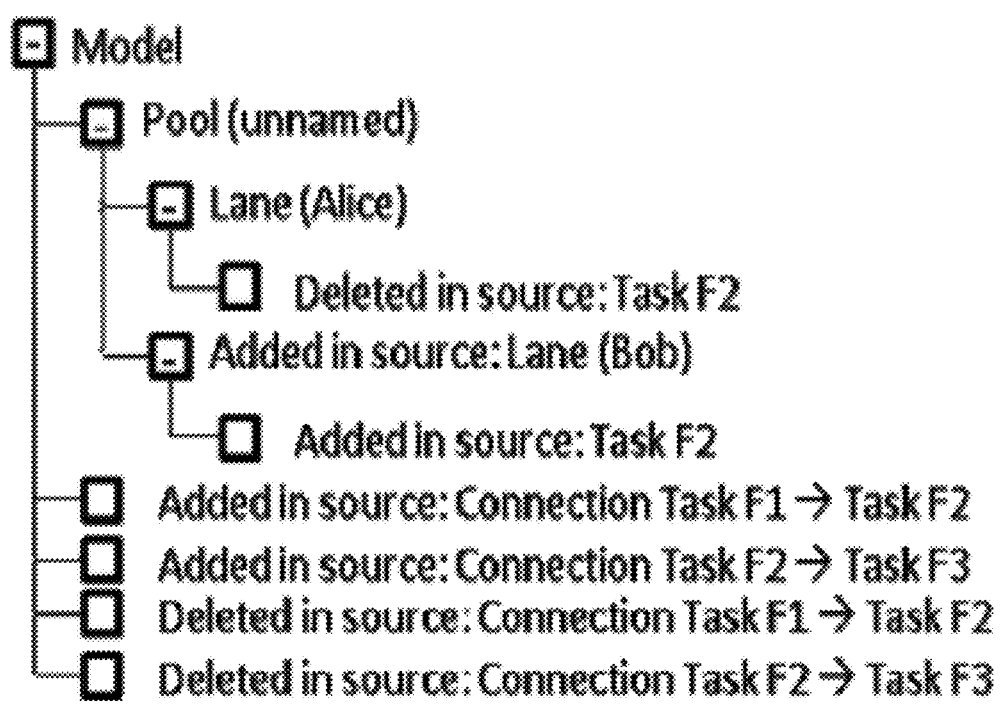
FIG. 17 is an "IRSA-style" representation of the conflicts from FIG. 7.

Although the "structural differences" view of IRSA might at first seem similar to the tree structure formed by the high-level issues described herein, as indicated above, IRSA's grouping of atomic differences is purely based on the (containment) structure of the internal model representation. By contrast, the approach described herein and ARIS in general tries to hide this. To better illustrate the differences, assume that the IRSA approach were adapted to the ARIS world and grouped atomic merge issues based on containment. As an example, consider the conflict model from FIG. 7. Here, atomic conflicts would be grouped based on their respective container element, as shown in FIG. 17 below. The added Task "F2" and the deleted Task "F2" would be shown below the tree node representing their containing lane Bob and Alice, respectively. Similarly, the "add" issue for the lane "Bob" itself would be shown below the tree node for the (unnamed) pool. They could now be accepted individually, per lane, or per pool. But this simple example already highlights the limitations of the IRSA approach, e.g., when the atomic issues for the connections to and from the added or deleted tasks "F2" are considered. In ARIS, connections themselves are not actually represented as being contained in a container, even if both their source and target objects are directly or indirectly within the same container. Consequently, all issues involving connections are shown as child elements of the tree node representing the model. This is a product of the nature of containment relationships involving connections (or, rather, the lack thereof) in ARIS. The same problems also occur in IRSA. For example, for UML associations, which roughly correspond to ARIS connections for the purposes of this discussion, similar problems occur, as an association is an independent model element that is not contained in any of the classes it connects.

Thus, as the FIG. 17 example illustrates, while the IRSA approach makes it possible to accept or reject all differences for one container on any level of the containment hierarchy (and consequently, all changes at once when doing it on the root container, e.g., the model itself), this approach does not consider the actual semantics of the change, as it does not properly group semantically associated issues, much less give the user any indication of what kind of operations were (probably) performed.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of resolving model merge conflicts, the method comprising:
   generating, via at least one processor, a conflict model based on a merging together of first and second models;
   automatically detecting, via the at least one processor, at least one high-level conflict based on at least one merge state and at least one grouping of one or more objects being merged from the first and second models in the conflict model;
   providing for display a list of the at least one detected high-level conflict, along with a visual representation of the conflict model, wherein each said high-level conflict includes a combination of atomic and/or other high-level conflicts and is classified as either (a) a simple high-level conflict that includes as its constituent(s) a plurality of atomic conflicts, or (b) a complex high-level conflict that includes as its constituent(s) at least one other high-level conflict; and
   enabling a user to resolve the at least one detected high-level conflict after the displaying of the list and the visual representation of the conflict model, the resolving of the at least one detected high-level conflict includes accepting or rejecting the at least one high-level conflict and automatically accepting or rejecting one or more atomic conflicts corresponding to the accepted or rejected at least one high-level conflict, wherein
   each said detected high-level conflict has an associated type,
   simple high-level conflict types include at least: same state container connection, group of connected elements with atomic conflict of same type, simple container change, and simple symbol change high-level conflict types, and
   complex high-level conflict types include at least: replacement in source model, replacement in target model, group of container changes, and group of symbol changes high-level conflict types.

2. The method of claim 1, wherein the first model is a merge target model and the second model is a transformed model, the transformed model having been generated by applying a model transformation to a source model.

3. The method of claim 1, wherein the detecting is based on information obtained during said merging.

4. The method of claim 3, wherein the information includes merge states of objects including whether said objects are equal, changed, added, or conflicting, along with object constellation(s) or grouping(s).

5. The method of claim 1, wherein each said detected high-level conflict is displayable in a hierarchical format.

6. The method of claim 1, wherein at least some types of detected high-level conflicts are automatically resolvable only at the detected high-level conflict level.

7. The method of claim 6, wherein at least some types of detected high-level conflicts are decomposable and resolvable at a corresponding constituent level.

8. The method of claim 1, wherein at least some types of detected high-level conflicts are decomposable and resolvable at a corresponding constituent level.

9. The method of claim 1, wherein each said model is based on an ARIS modeling language.

10. The method of claim 1, further comprising determining and displaying an inverse conflict for at least one corresponding detected conflict.

11. A non-transitory computer readable storage medium tangibly storing instructions that, when executed by at least one processor of a system, performs functionality comprising:
    generating, via at least one processor, a conflict model based on a merging together of first and second models;
    automatically detecting, via the at least one processor, at least one high-level conflict based on at least one merge state and at least one grouping of one or more objects being merged from the first and second models in the conflict model;
    providing for display a list of the at least one detected high-level conflict, along with a visual representation of the conflict model, wherein each said high-level conflict includes a combination of atomic and/or other high-level conflicts and is classified as either (a) a simple high-level conflict that includes as its constituent(s) a plurality of atomic conflicts, or (b) a complex high-level conflict that includes as its constituent(s) at least one other high-level conflict; and
    enabling a user to resolve the at least one detected high-level conflict after the displaying of the list and the visual representation of the conflict model, wherein resolving the at least one detected high-level conflict includes accepting or rejecting the at least one high-level conflict and automatically accepting or rejecting and thus resolving at least one atomic conflict, the at least one atomic conflict being a sub-conflict of the at least one high-level conflict, wherein
    each said detected high-level conflict has an associated type,
    simple high-level conflict types include at least: same state container connection, group of connected elements with atomic conflict of same type, simple container change, and simple symbol change high-level conflict types, and
    complex high-level conflict types include at least: replacement in source model, replacement in target model, group of container changes, and group of symbol changes high-level conflict types.

12. A system for resolving model merge conflicts, comprising:
    at least one memory; and
    at least one processor communicatively coupled with the at least one memory and configured to:
    generate a conflict model based on a merging together of first and second models, the merging being performable via a merge engine, automatically detect high-level conflicts within the conflict model based at least in part on at least one merge state and at least one grouping of one or more objects being merged from the first and second models in the conflict model, and provide for display, via a user interface, a list of detected high-level conflicts, along with a visual representation of the conflict model, wherein each high-level conflict is of a predefined type, includes constituent conflicts, and either is (a) a simple high-level conflict that includes as its constituent(s) a plurality of atomic conflicts, or (b) a complex high-level conflict that includes as its constituent(s) at least one other high-level conflict, wherein the user interface is further programmed to receive user input enabling a user to resolve detected high-level conflicts, wherein resolution of the at least one detected high-level conflict includes accepting or rejecting the at least one high-level conflict and automatically accepting or rejecting one or more atomic conflicts corresponding to the accepted or rejected at least one high-level conflict, each said detected high-level conflict has an associated type, simple high-level conflict types include at least: same state container connection, group of connected elements with atomic conflict of same type, simple container change, and simple symbol change high-level conflict types, and complex high-level conflict types include at least: replacement in source model, replacement in target model, group of container changes, and group of symbol changes high-level conflict types.

13. The system of claim 12, wherein the at least one processor is further configured to perform functionality comprising receiving user input enabling the user to create models and define transforms for models.

14. The system of claim 13, wherein the first model is a merge target model and the second model is a transformed model, the transformed model having been generated by applying a model transformation to a source model.

15. The system of claim 12, wherein the merge engine is configured to store information including merge states of objects including whether said objects are equal, changed, added, or conflicting, along with object constellation(s) or grouping(s).

16. The system of claim 12, wherein at least some types of detected high-level conflicts are resolvable only at the detected high-level conflict level.

17. The system of claim 12, wherein at least some types of detected high-level conflicts are decomposable and resolvable at a corresponding constituent level.

18. The system of claim 12, wherein the user interface is further configured to display an inverse sub-conflict or constituent for at least one corresponding detected sub-conflict or constituent.

19. A method of resolving model merge conflicts, the method comprising:
generating, via at least one processor, a conflict model based on a merging together of first and second models;
automatically detecting, via the at least one processor, at least one high-level conflict based on at least one merge state and at least one grouping of one or more objects being merged from the first and second models in the conflict model, wherein each said high-level conflict comprises at least one atomic and/or other high-level conflict and is classified as either (a) a simple high-level conflict that includes as its constituent(s) a plurality of atomic conflicts, or (b) a complex high-level conflict that includes as its constituent(s) at least one other high-level conflict; and enabling a user to resolve the at least one detected high-level conflict by accepting or rejecting the at least one high-level conflict where one or more atomic conflicts corresponding to the accepted or rejected at least one high-level conflict are also automatically accepted or rejected, wherein each said detected high-level conflict has an associated type, simple high-level conflict types include at least: same state container connection, group of connected elements with atomic conflict of same type, simple container change, and simple symbol change high-level conflict types, and complex high-level conflict types include at least: replacement in source model, replacement in target model, group of container changes, and group of symbol changes high-level conflict types.

20. The method of claim 19, further comprising:
displaying a list of the at least one detected high-level conflict, along with a visual representation of the conflict model,
wherein the enabling a user to resolve the at least one detected high-level conflict is performed after the displaying of the list and the visual representation of the conflict model.

21. The method of claim 19, wherein the detecting is performed following said generating.

22. The method of claim 19, wherein the detecting is based on information obtained during said merging.

23. The method of the preceding claim 22, wherein the information includes merge states of objects including whether said objects are equal, changed, added, or conflicting, along with object constellation(s) or grouping(s).

24. The method of claim 19, wherein at least some types of detected high-level conflicts are automatically resolvable only at the detected high-level conflict level and/or are decomposable and resolvable at a corresponding constituent level.

25. The method of claim 19, further comprising determining and displaying an inverse conflict for at least one corresponding detected conflict.

26. A system for resolving model merge conflicts, comprising:
at least one memory; and
at least one processor communicatively coupled with the at least one memory and configured to:
generate a conflict model based on a merging together of first and second models;
automatically detect high-level conflicts within the conflict model based on at least one merge state and at least one grouping of one or more objects being merged from the first and second models in the conflict model, wherein each said high-level conflict comprises at least one atomic and/or other high-level conflict and is classified as either (a) a simple high-level conflict that includes as its constituent(s) a plurality of atomic conflicts, or (b) a complex high-level conflict that includes as its constituent(s) at least one other high-level conflict; and
receive, via a user interface, user input enabling a user to resolve detected high-level conflicts by accepting or rejecting the at least one high-level conflict where one or more atomic conflicts corresponding to the accepted or rejected at least one high-level conflict are also automatically accepted or rejected, each said detected high-level conflict has an associated type, simple high-level conflict types include at least: same state container connection, group of connected elements with atomic conflict of same type, simple container change, and simple symbol change high-level conflict types, and complex high-level conflict types include at least: replacement in source model, replacement in target model, group of container changes, and group of symbol changes high-level conflict types.

27. The system of claim 26, wherein the user interface is further configured to display a list of detected high-level conflicts, along with a visual representation of the conflict model.

28. The system of claim 26, wherein high-level conflicts within the conflict model are detected based at least in part on output from a merge engine.

29. The system of claim 26, wherein the merging together of first and second models is performable via a merge engine.

30. The method of claim 1, wherein the generating the conflict model occurs during a post-processing of the merging together of the first and the second models in order to allow for recognition of high-level merge conflicts based on constellations of model elements in the conflict model and merge states of the model elements in the conflict model.

31. The method of claim 1, wherein the resolving of the at least one detected high-level conflict includes automatically resolving all simple atomic conflicts that necessarily underlie the at least one detected high-level conflict being resolved.

32. The method of claim 1, wherein the constituent(s) of the high-level conflict include(s) a group of sub-conflicts and inverse sub-conflicts.

33. The method of claim 32, wherein
when accepting a high-level conflict, the sub-conflicts are automatically accepted and the inverse sub-conflicts are automatically rejected, and
when rejecting the high-level conflict, the sub-conflicts are automatically rejected and the inverse sub-conflicts are automatically accepted.

* * * * *